United States Patent
Lanzone et al.

(10) Patent No.: US 9,774,387 B2
(45) Date of Patent: Sep. 26, 2017

(54) PROTECTION FOR OPTICAL TRANSPORT NETWORK WITH DUAL HOMED ATTACHMENT CIRCUITS

(71) Applicant: Telefonaktiebolaget L M Ericsson (publ), Stockholm (SE)

(72) Inventors: Sergio Lanzone, Genoa (IT); Andrea Corti, Varazze (IT); Annamaria Fulignoli, Latina (IT)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 14/762,732

(22) PCT Filed: Jan. 25, 2013

(86) PCT No.: PCT/EP2013/051481
§ 371 (c)(1),
(2) Date: Jul. 22, 2015

(87) PCT Pub. No.: WO2014/114349
PCT Pub. Date: Jul. 31, 2014

(65) Prior Publication Data
US 2015/0326309 A1    Nov. 12, 2015

(51) Int. Cl.
*H04B 10/00* (2013.01)
*H04B 10/032* (2013.01)
(Continued)

(52) U.S. Cl.
CPC ........... *H04B 10/032* (2013.01); *H04B 10/27* (2013.01); *H04J 3/14* (2013.01); *H04J 2203/006* (2013.01); *H04J 2203/0028* (2013.01)

(58) Field of Classification Search
CPC ......... H04L 45/00; H04L 41/06; H04L 45/28; H04J 3/14; H04J 2203/006; H04B 10/27
(Continued)

(56) References Cited

U.S. PATENT DOCUMENTS 7,345,991 B1 * 3/2008 Shabtay .............. H04L 12/2863
                                                    370/221
9,178,713 B1 * 11/2015 Johnston ............... H04L 7/0075
(Continued)

OTHER PUBLICATIONS

International Search Report for International application No. PCT/EP2013/051481, Sep. 12, 2013.
(Continued)

*Primary Examiner* — Don N Vo
(74) *Attorney, Agent, or Firm* — Baker Botts, LLP

(57) ABSTRACT

For protecting traffic on paths extending from a source client entity (CE1) to a destination client entity (CE2) via an optical transport network and attachment circuits at ingress (A,B) and egress (C,D) nodes, there are multiple paths within the OTN network, and the attachment circuits are dual homed. By sending (120) an indication of operational status of the dual homed attachment circuits within overhead associated with the traffic and sent with the traffic through the network, a selection can be made (130) of which of the provided paths and attachment circuits to use for the traffic, based on the indicated operational status, and on OTN fault detection, to protect against a fault in the attachment circuit or in the OTN network. Thus protection can extend across the edge nodes without the complexity and delays involved in interworking of separate protection schemes and without a control plane.

16 Claims, 20 Drawing Sheets

(51) Int. Cl.
*H04B 10/27* (2013.01)
*H04J 3/14* (2006.01)

(58) Field of Classification Search
USPC .............................................. 398/2
See application file for complete search history.

(56) References Cited

U.S. PATENT DOCUMENTS

| 2011/0206061 A1* | 8/2011 | Sandstrom | H04J 3/047 370/458 |
| 2012/0120850 A1* | 5/2012 | Sergeev | H04L 12/2859 370/255 |
| 2013/0216217 A1* | 8/2013 | Sharma | H04J 14/08 398/8 |

OTHER PUBLICATIONS

A G.709 Optical Transport Network Tutorial by Guylain Barlow; JDSU White Paper, 2009.
Inter-Chassis Communication Protocol for L2VPN PE Redundancy by Luca Martini et al., Jun. 18, 2009.
Cisco P802.1 1AXbq editing plan; Rev 1 by Norman Finn; Singapore, Mar. 2011.
Realising the Benefits of SDH Technology for the Delivery of Services in the Access Network by Mark Compton et al.; BT Laboratories, May 1, 1994.
ICCP extension for the MSP application by H Hao et al., Oct. 22, 2012.
International Telecommunication Union; Telecommunication Standardization Sector; Study Period 2009-2012; Study Group 15; TD 308 Rev.1 (WP 3/15); Source: Editor G.873.1; Title: G.873.1 living list; Temporary Document, May 31-Jun. 11, 2010.

* cited by examiner

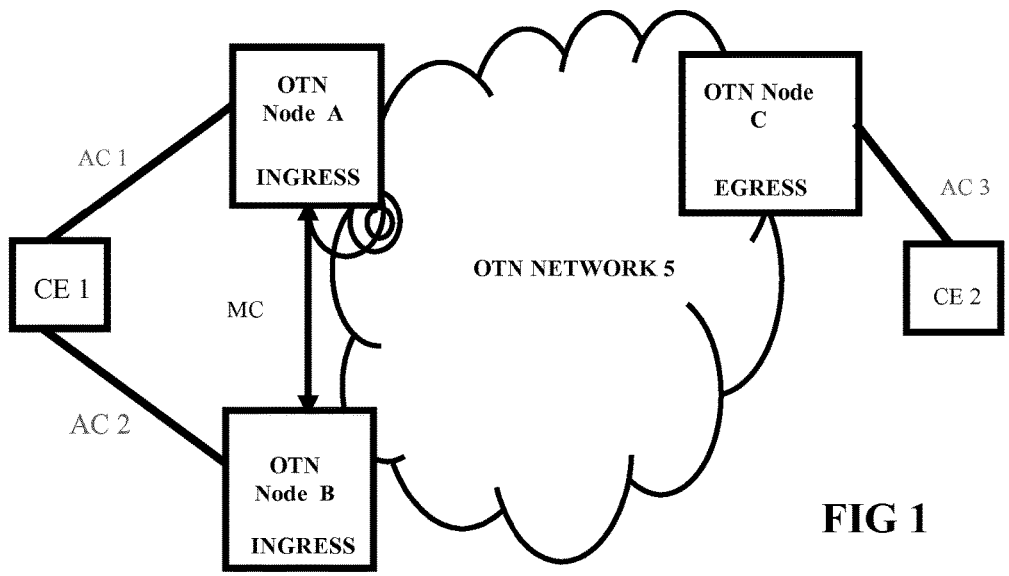
FIG 1
FIG 2
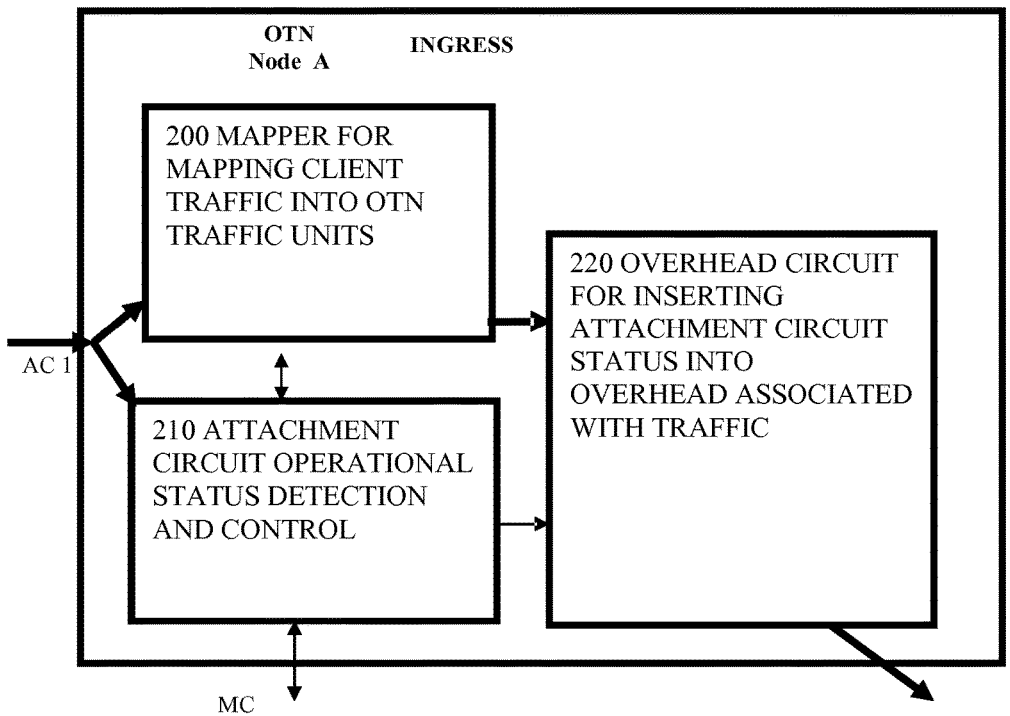

SCENARIO 1

---

102 FOR BIDIRECTIONAL TRAFFIC, SET UP WORKING AND PROTECTION PATHS FOR TRAFFIC FROM SOURCE CLIENT ENTITY VIA DUAL HOMED ATTACHMENT CIRCUITS TO OPTICAL NETWORK INGRESS NODES AND FROM OPTICAL NETWORK EGRESS NODES VIA DUAL HOMED ATTACHMENT CIRCUITS TO DESTINATION CLIENT ENTITY AND SET UP CORRESPONDING PATHS IN THE REVERSE DIRECTION

↓

112 FOR BOTH DIRECTIONS, AT INGRESS NODE, INSERT INDICATION OF STATUS OF DUAL HOMED ATTACHMENT CIRCUITS INTO OVERHEAD ASSOCIATED WITH THE TRAFFIC AND SENT WITH THE TRAFFIC

↓

122 FOR BOTH DIRECTIONS SEND THE OVERHEAD HAVING THE INDICATION OF STATUS OF THE ATTACHMENT CIRCUIT, BY BICASTING FROM THE INGRESS NODE WITH THE TRAFFIC THROUGH THE OPTICAL NETWORK ON BOTH THE WORKING AND PROTECTION PATHS, TO DIFFERENT EGRESS NODES

↓

132 FOR BOTH DIRECTIONS, AT THE EGRESS NODES, SELECT WHICH EGRESS NODE AND SELECT THE CORRESPONDING EGRESS ATTACHMENT CIRCUIT TO USE FOR THE TRAFFIC, BASED ON THE INDICATIONS OF AC STATUS, AND OPTIONALLY BASED ON OTN FAULT DETECTION, AND SELECT WHICH OF THE PATHS RECEIVED AT THAT SELECTED EGRESS NODE TO USE BASED ON THE INGRESS AC STATUS

↓

140 AT THE EGRESS NODES, INSERT THE NEW STATUS OF THE EGRESS ATTACHMENT CIRCUITS INTO OVERHEAD SENT IN THE REVERSE DIRECTION, TO FEED BACK THE STATUS TO INGRESS NODES

FIG 12

FIG 13 SCENARIO 2 AFTER
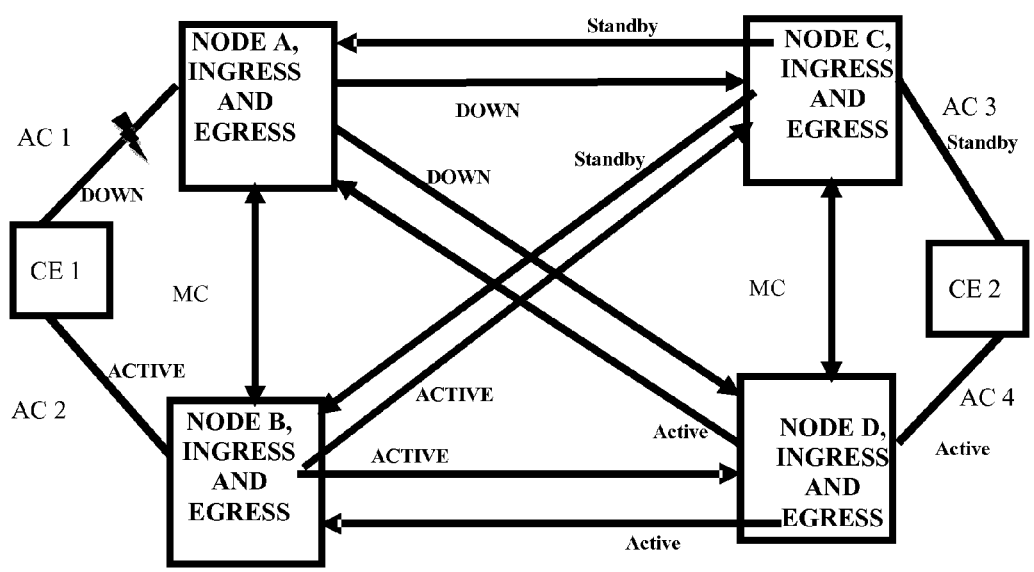

FIG 15  SCENARIO 3 BEFORE OR AFTER
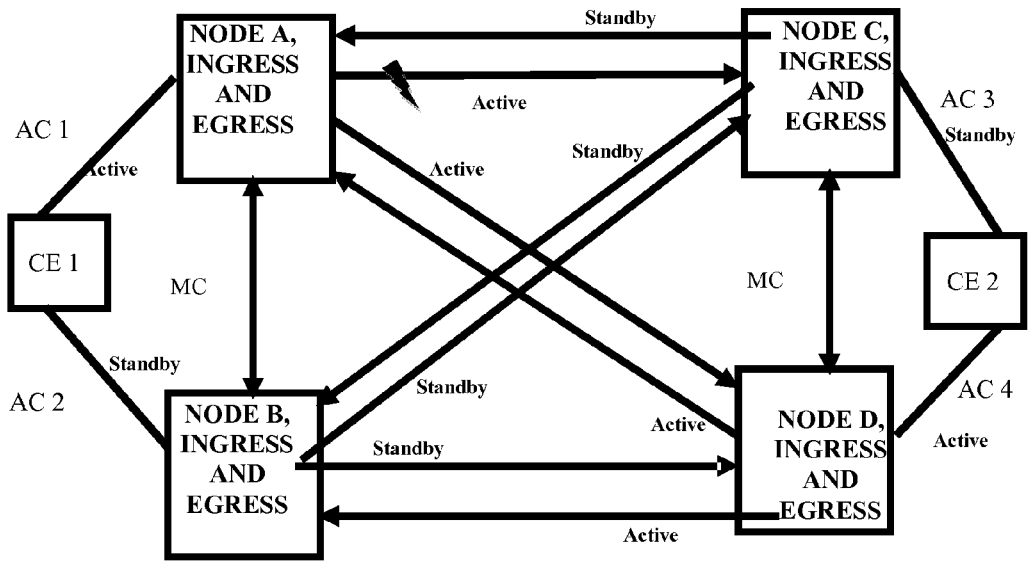
FIG 16  SCENARIO 4 BEFORE
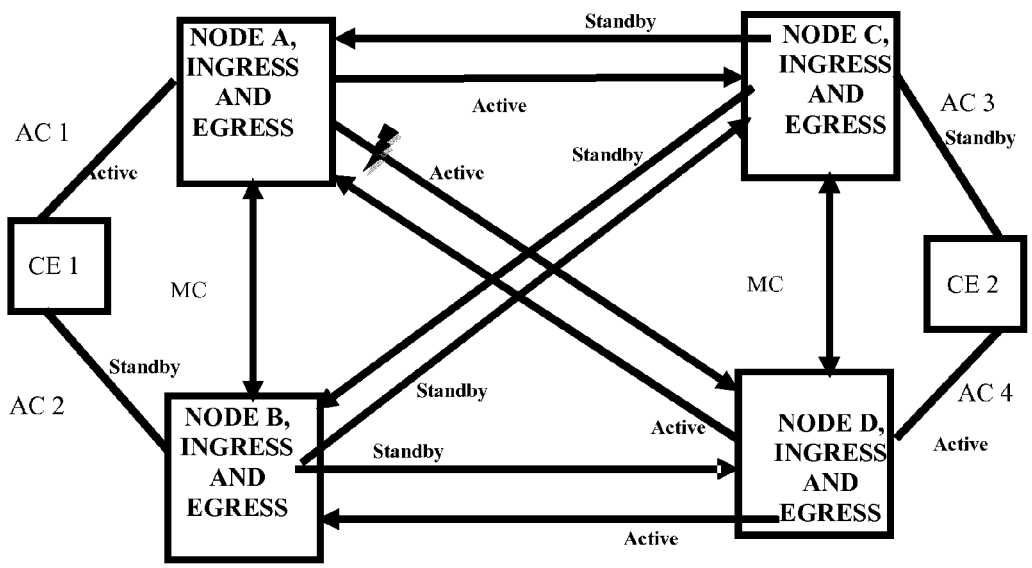

SCENARIO 4

FIG 18 SCENARIO 4 AFTER
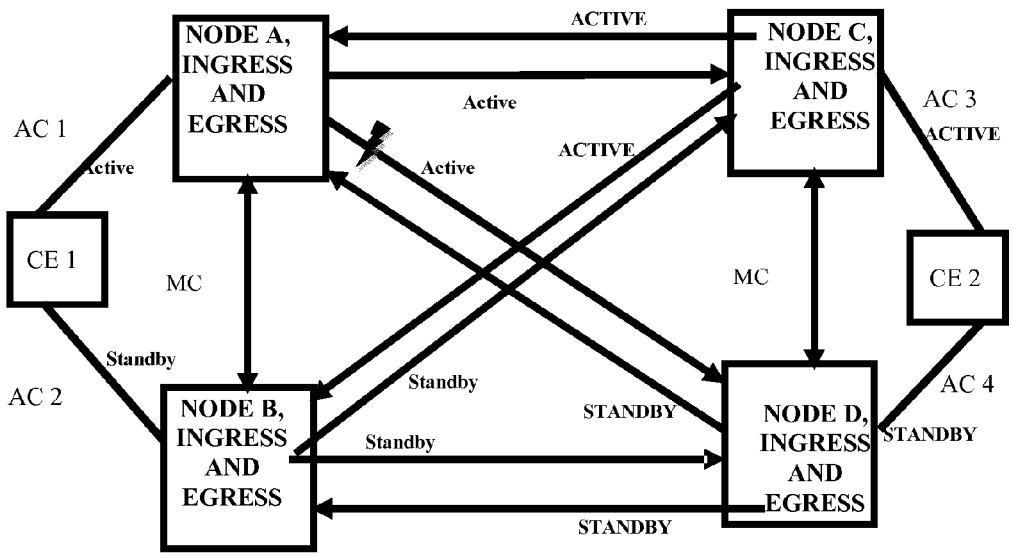
FIG 19 SCENARIO 5 BEFORE
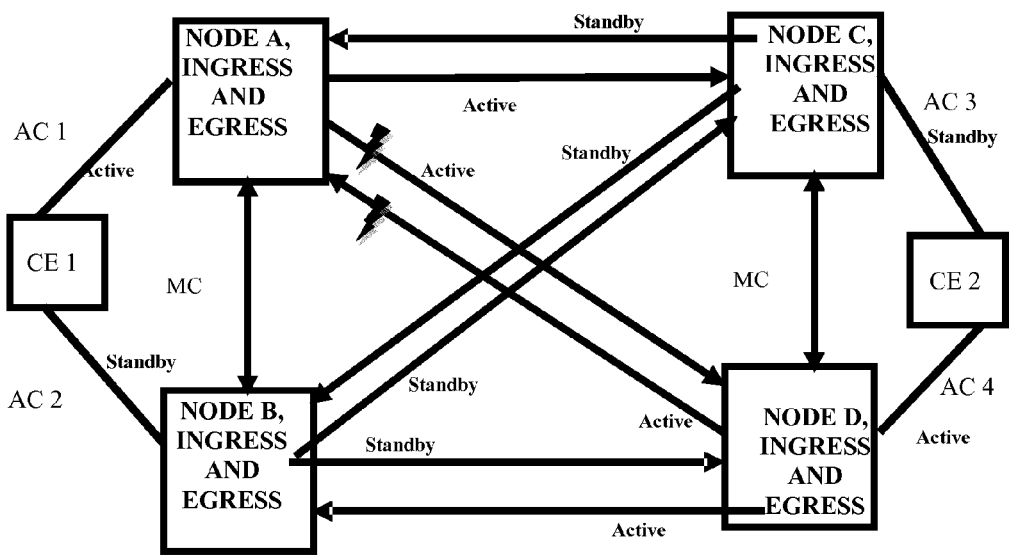

FIG 20  SCENARIO 5

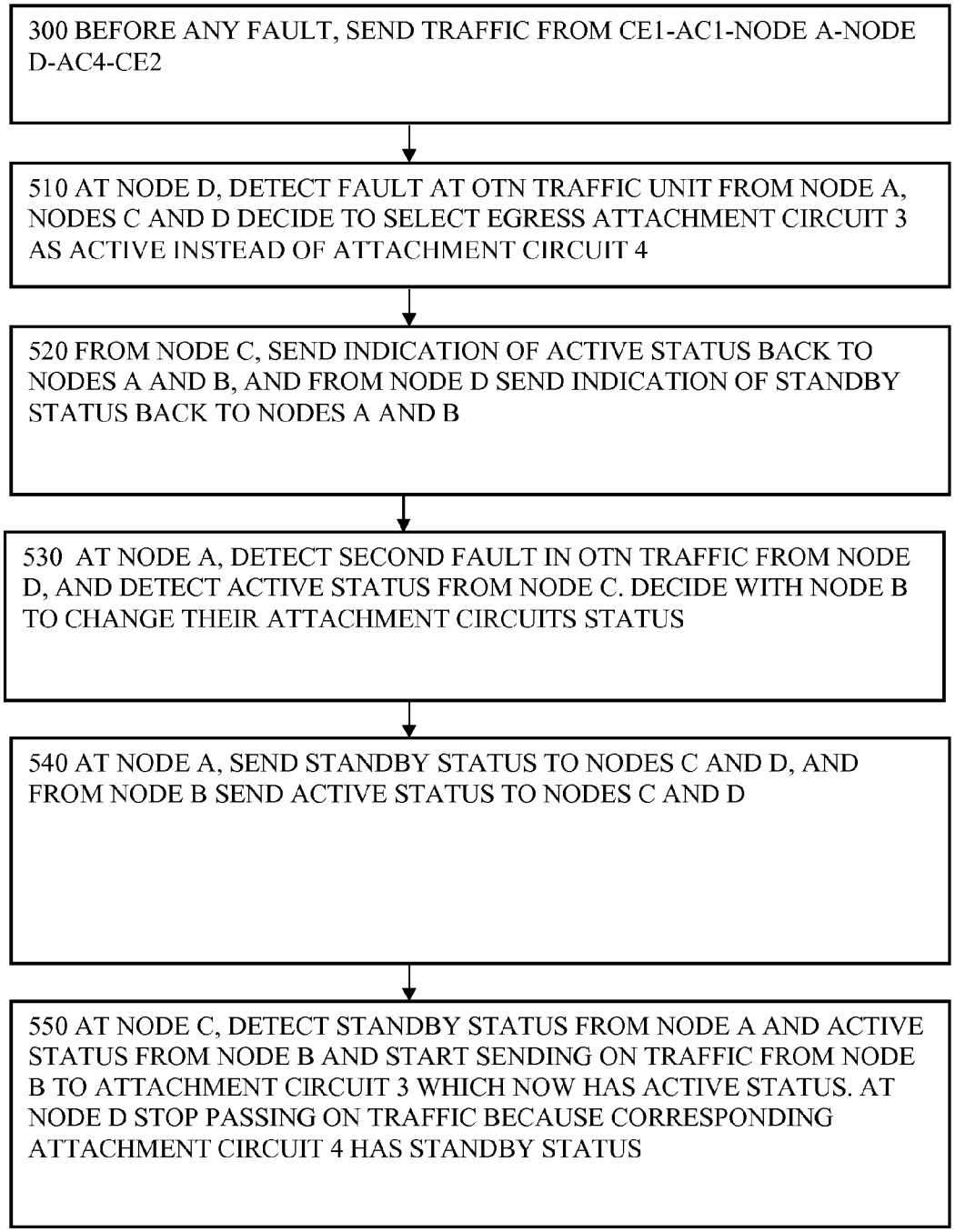

300 BEFORE ANY FAULT, SEND TRAFFIC FROM CE1-AC1-NODE A-NODE D-AC4-CE2

510 AT NODE D, DETECT FAULT AT OTN TRAFFIC UNIT FROM NODE A, NODES C AND D DECIDE TO SELECT EGRESS ATTACHMENT CIRCUIT 3 AS ACTIVE INSTEAD OF ATTACHMENT CIRCUIT 4

520 FROM NODE C, SEND INDICATION OF ACTIVE STATUS BACK TO NODES A AND B, AND FROM NODE D SEND INDICATION OF STANDBY STATUS BACK TO NODES A AND B

530 AT NODE A, DETECT SECOND FAULT IN OTN TRAFFIC FROM NODE D, AND DETECT ACTIVE STATUS FROM NODE C. DECIDE WITH NODE B TO CHANGE THEIR ATTACHMENT CIRCUITS STATUS

540 AT NODE A, SEND STANDBY STATUS TO NODES C AND D, AND FROM NODE B SEND ACTIVE STATUS TO NODES C AND D

550 AT NODE C, DETECT STANDBY STATUS FROM NODE A AND ACTIVE STATUS FROM NODE B AND START SENDING ON TRAFFIC FROM NODE B TO ATTACHMENT CIRCUIT 3 WHICH NOW HAS ACTIVE STATUS. AT NODE D STOP PASSING ON TRAFFIC BECAUSE CORRESPONDING ATTACHMENT CIRCUIT 4 HAS STANDBY STATUS

FIG 21  SCENARIO 5 AFTER
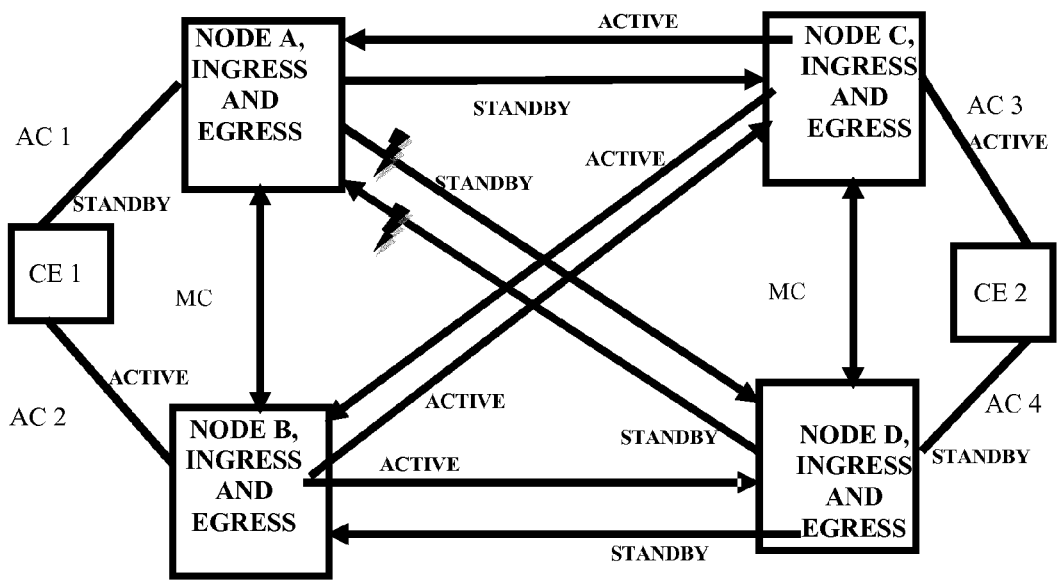
FIG 22  SCENARIO 6 BEFORE
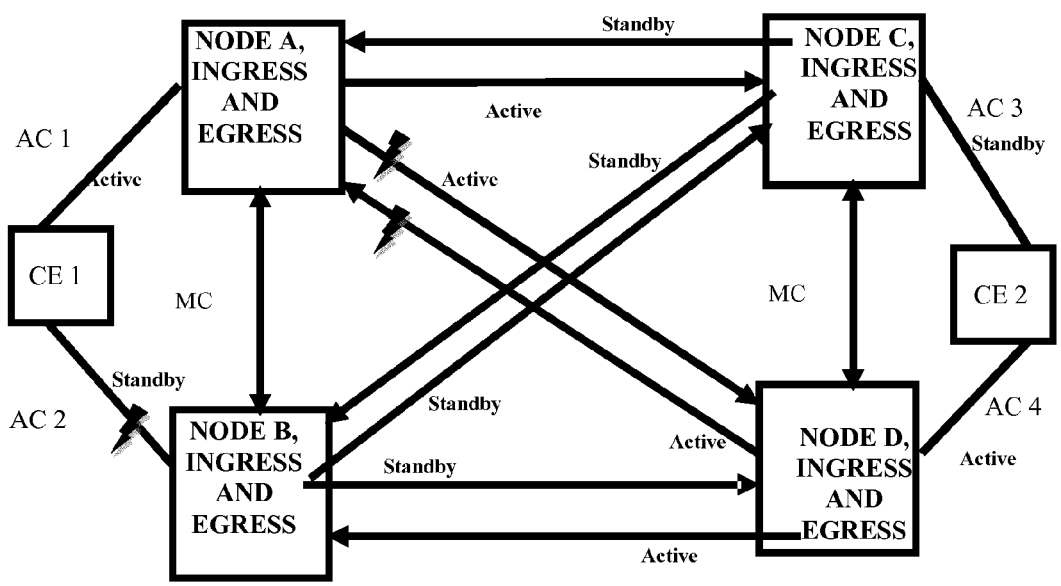

FIG 23     SCENARIO 6
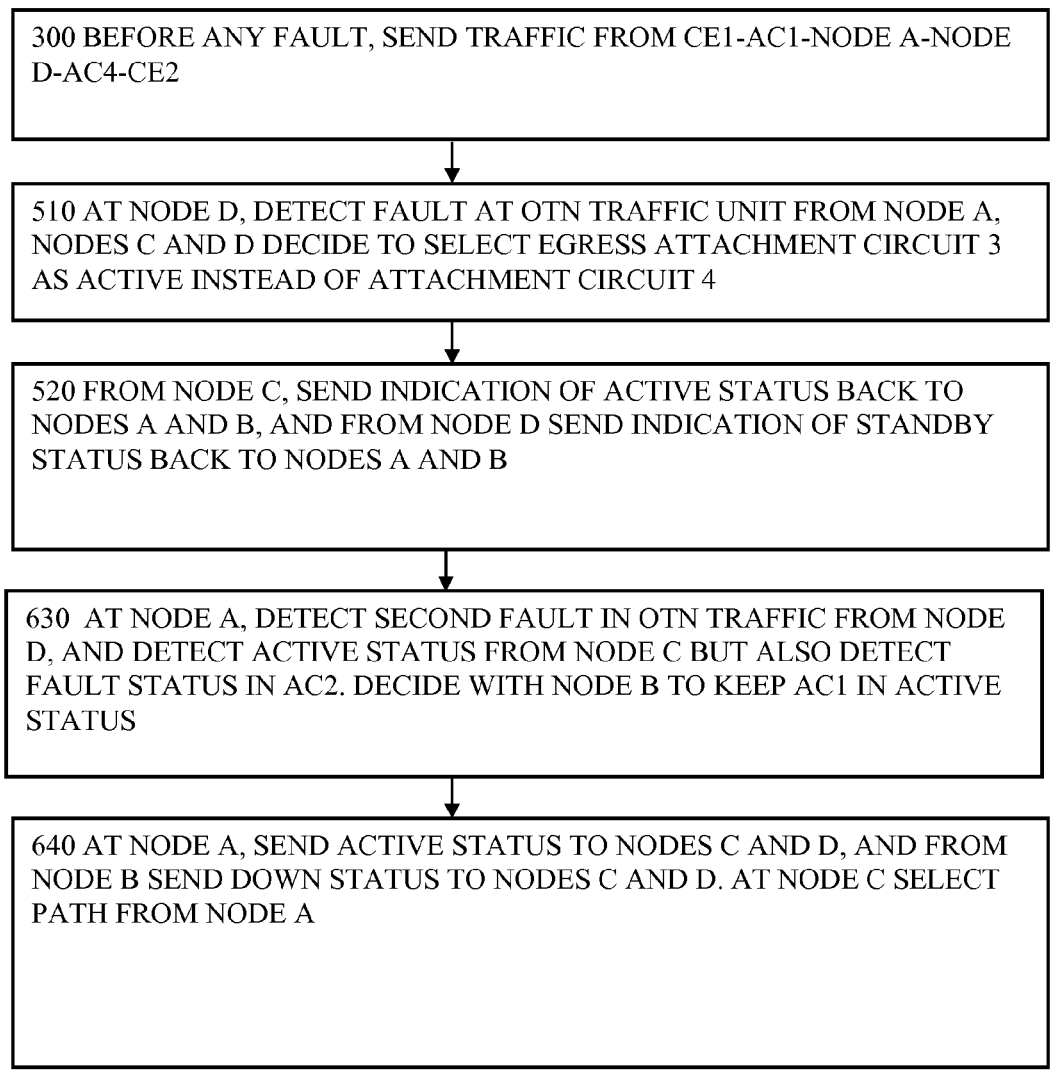

FIG 24 SCENARIO 6 AFTER
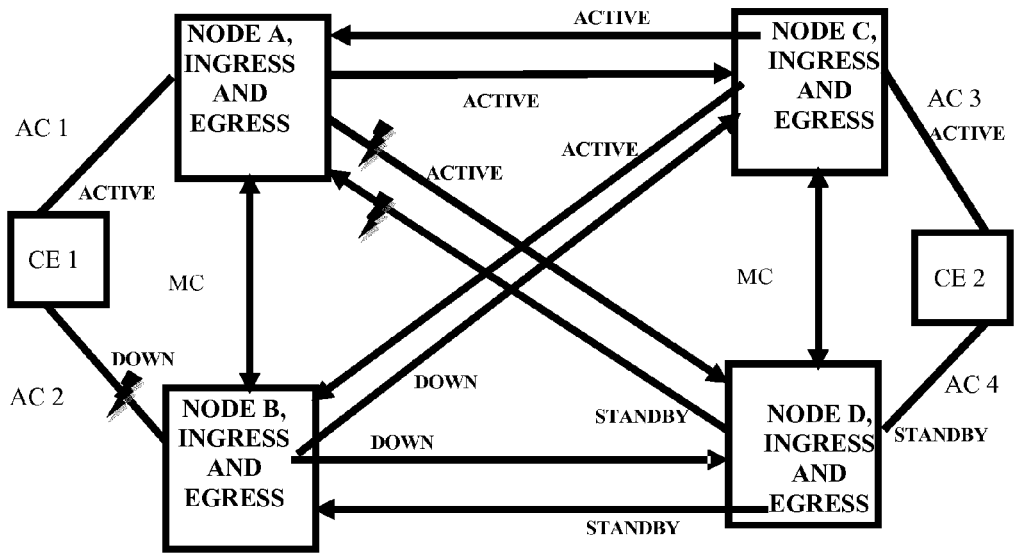
FIG 25 SCENARIO 7 BEFORE
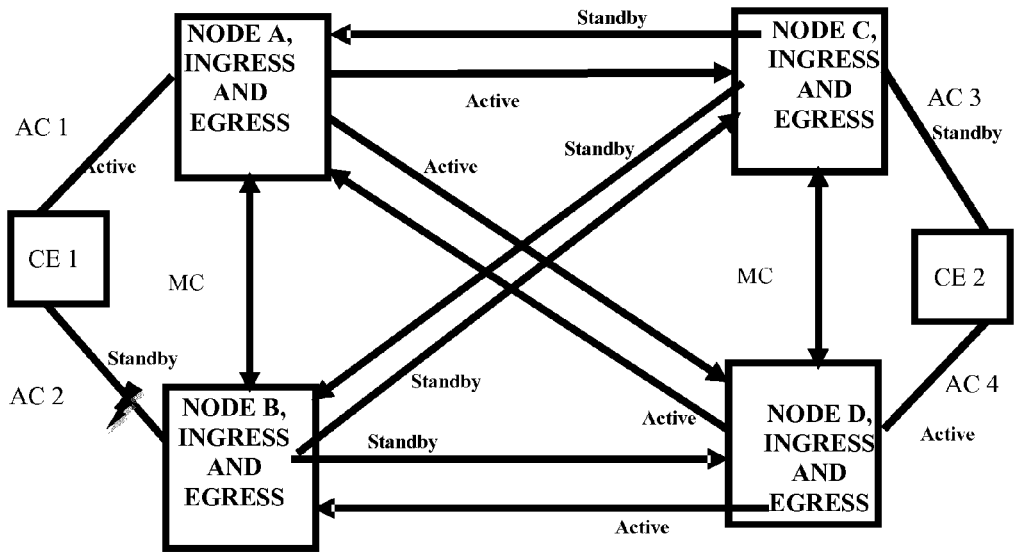

FIG 26 SCENARIO 7
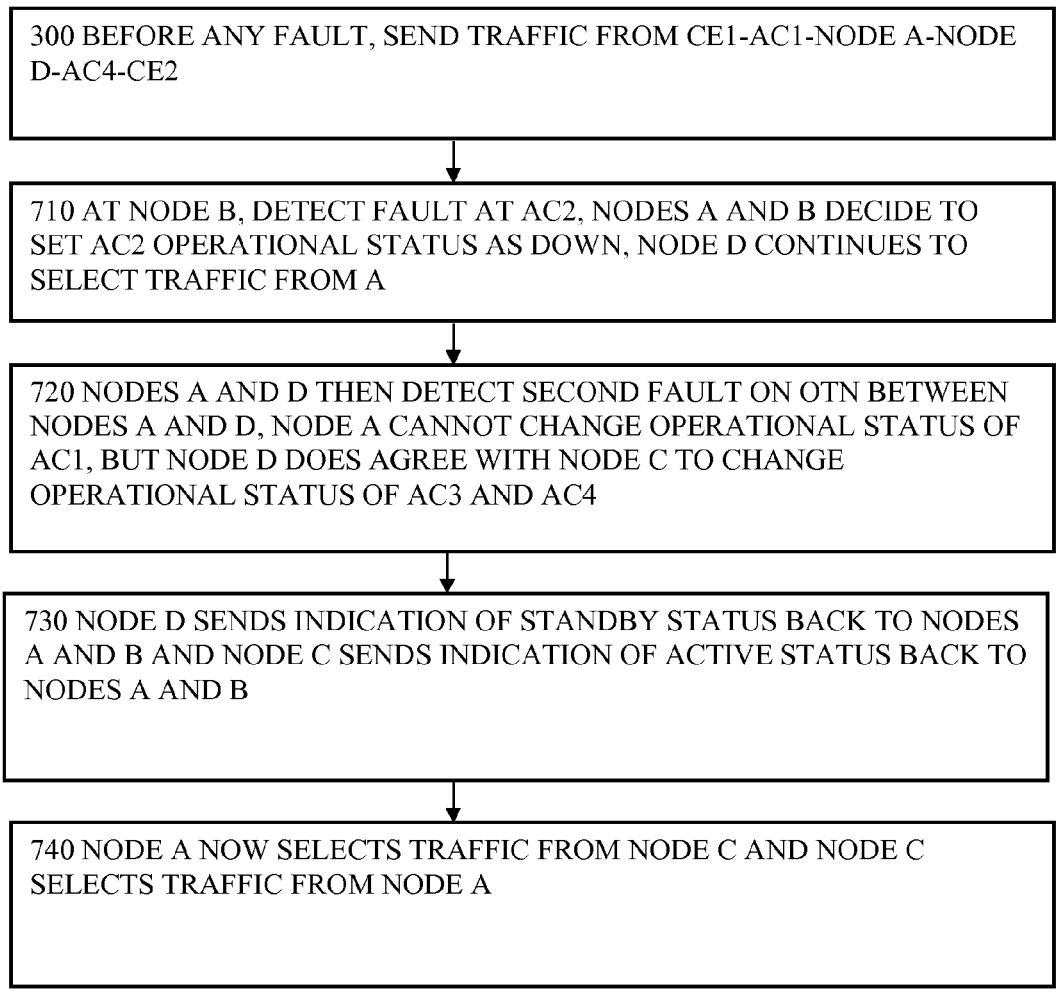

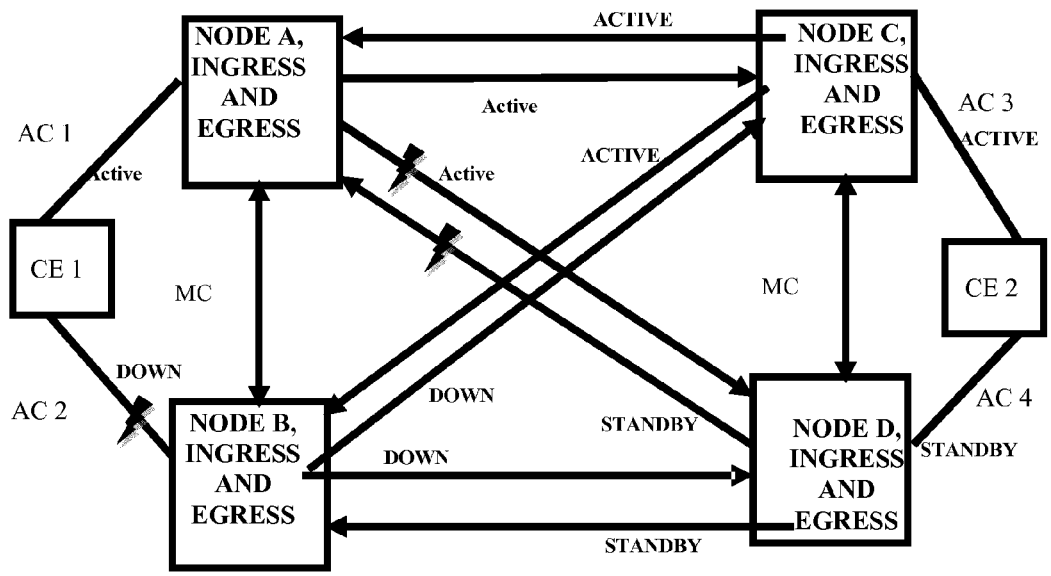
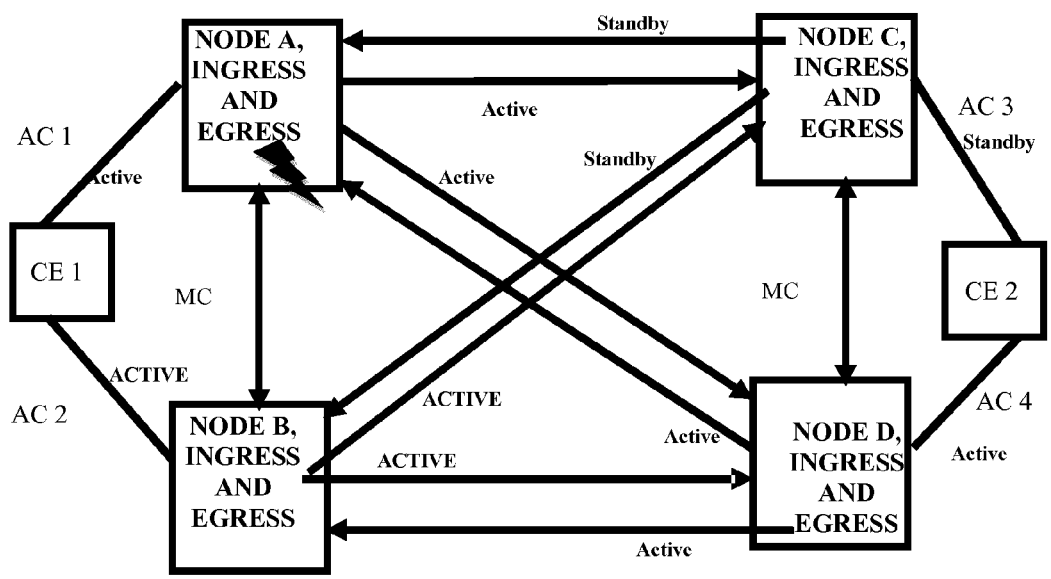

PROTECTION FOR OPTICAL TRANSPORT NETWORK WITH DUAL HOMED ATTACHMENT CIRCUITS

PRIORITY

This nonprovisional application is a U.S. National Stage Filing under 35 U.S.C. §371 of International Patent Application Serial No. PCT/EP2013/051481, filed Jan. 25, 2013, and entitled "Protection For Optical Transport Network With Dual Homed Attachment Circuits."

FIELD

The present invention relates to methods of protecting traffic in a communications network, to nodes configured to operate as an egress node, to nodes configured to operate as an ingress node, to optical transport networks having such nodes, to signals in such optical transport networks and to corresponding computer programs.

BACKGROUND

Currently communication networks such as optical backbone networks are mainly based on OTN transport networks which typically follow a standard defined by ITU-T G.709/G.798. This allows the transport of many kinds of traffic using a variety of technologies (e.g Ethernet, SDH, etc). Inside the OTN network the traffic can be protected against faults using standard ODUk SNC protection as defined by ITU-T G.873.1. In particular, single homed CE client traffic transported inside the OTN network scenario can be addressed by ITU-T G.873.1

For instance, client side, the links to the edge node can be protected by MSP protection on SDH interfaces or by a LAG protocol on Ethernet interfaces. On the OTN side, where there are dual OTUk uplinks to other OTN nodes, the protection can be realized using ODUk SNC/I (i.e SNC Inherent) as defined by ITU-T G.873.1.

Another single homed scenario can be envisaged where there are separate links from the edge node to multiple other OTN nodes. At the client side the links can be protected by MSP protection on SDH interfaces or by LAG protocol on Ethernet interfaces as for the previous example. On the OTN side, the protection can be realized using ODUk SNC/N as defined by ITU-T G.873.1

The existing OTN protection mechanisms however cannot address a dual homed CE scenario. Protection schemes are generally arranged to compensate for failures in a network by detecting failure of one of the nodes, or inter-node connections, in the network, and re-routing traffic to bypass the failure. Networks generally have a number of edge nodes at which traffic can enter and leave the network, and a number of intermediate nodes through which traffic can pass to travel from any one edge node to any other. Customer equipment that is arranged to communicate over the network will generally communicate with one or more edge nodes. In a single homed scenario, the customer equipment can only communicate with one edge node which operates as the ingress node. Therefore any re-routing carried out by the protection scheme cannot bypass the ingress node at which traffic enters the network, or the egress node at which it leaves the network.

Dual homed schemes are known in which the customer equipment can communicate with more than one ingress or egress node. This provides resiliency so that if one of the edge nodes suffers a failure, then the customer equipment can still communicate over the network. However such dual homed schemes are not compatible with the existing OTN protection schemes, which have no way of handling a change in ingress or egress node.

SUMMARY

Embodiments of the invention provide improved methods and apparatus. According to a first aspect of the invention, there is provided a method of protecting traffic in a communications network, the communications network providing paths for the traffic extending from a source client entity to a destination client entity via an optical transport network. Attachment circuits are provided for coupling the source client entity to corresponding ingress nodes of the optical transport network, and at the egress, for coupling corresponding egress nodes of the optical transport network to the destination client entity. The attachment circuits comprise dual homed attachment circuits at either or both ingress and egress. The paths comprise paths within the optical transport network, to couple respective pairs of the ingress and egress nodes. An indication of operational status of at least one of the dual homed attachment circuits is sent through the optical transport network, the indication being sent within overhead associated with the traffic and sent with the traffic. At a node of the optical transport network, a selection is made of which of the provided working paths, protection paths and attachment circuits to use for the traffic, based on the indication of operational status of the attachment circuits sent through the optical transport network, to protect the traffic against a fault in the attachment circuit or in the optical transport network.

Benefits can include reduced complexity and faster operation. The reduced complexity is because a single protection arrangement can now cover faults in both places, (the attachment circuits and the nodes or links of the optical transport network) which avoids the need for complex interworking between different protection schemes for attachment circuits and for links and nodes of the optical network. Also, by using overhead associated with the traffic, the use of more complex higher level signalling can be avoided, such as control plane signalling or overhead at higher levels in a multiplex hierarchy. The benefit of faster operation also arises from using overhead associated with the traffic, as any delays caused by the indications being routed or buffered separately from the traffic, or by the need to code and interpret which traffic or which nodes or which path the indications relate to, can be reduced or avoided. Also, while the method operates at the lowest layer, the data layer, it can still be compatible with other protection schemes operating at higher layers. See FIGS. 1 to 4 for example.

Another aspect of the invention provides a method of protecting traffic in a communications network, the communications network providing paths for the traffic extending from a source client entity to a destination client entity via an optical transport network, providing at least one attachment circuit for coupling the source client entity to corresponding ingress nodes of the optical transport network. Attachment circuits can be provided at the egress, for coupling corresponding egress nodes of the optical transport network to the destination client entity, the attachment circuits comprise dual homed attachment circuits at least at the ingress nodes, and the paths comprising paths within the optical transport network, to couple respective pairs of the ingress and egress nodes. At an ingress node an indication of operational status of at least one of the dual homed attachment circuits is inserted into overhead associated with the traffic, and the overhead with the indication within is sent with the traffic, to other nodes along the paths. This covers the steps at an ingress node, see FIG. 2 or 6 for example.

Another aspect provides a method of protecting traffic in a communications network, the communications network providing paths for the traffic extending from a source client entity to a destination client entity via an optical transport network, providing at least one attachment circuit for coupling the source client entity to corresponding ingress nodes of the optical transport network, and providing at least one attachment circuit at the egress, for coupling corresponding egress nodes of the optical transport network to the destination client entity, the attachment circuits comprising dual homed attachment circuits at at least one of the ingress nodes and the egress nodes, and the paths comprising paths within the optical transport network, to couple respective pairs of the ingress and egress nodes. There are steps of reading at a node of the optical transport network an indication of operational status of a corresponding dual homed attachment circuit, the indication being within overhead associated with the traffic and sent with the traffic. A selection is made of which of the provided paths and attachment circuits to use for the traffic, based on the indication of the operational status of the attachment circuits sent through the optical transport network, to protect the traffic against a fault in the attachment circuit or in the optical transport network. This covers the steps taking place at a node downstream of the ingress node, such as the egress node, see FIG. 3, 4 5 or 7 for example.

Embodiments can have any additional features added to those aspects set out above, or disclaimed from the definitions. Some such additional features are set out below and described in more detail with reference to the figures. One such additional feature is the step of receiving an indication of a fault in the paths in the optical transport network and the selecting step being based also on the fault indication. This can help enable better fault protection for OTN faults.

Another such additional feature is the operational status comprising at least one of an indication of a protection status, and an indication of a fault status. These are some of the most useful types of information for controlling the protection switching.

Another such additional feature is where the dual homing is at the ingress nodes, and where there are paths from the ingress nodes to the egress node, the sending step comprising sending the indication forwards along the paths, to the egress node, and the step of selecting comprises selecting at the egress node which of the paths to use for the traffic according to the indications received. A benefit of doing the selecting at the egress node rather than an intermediate node is that the protection can cover the full length of the path in the OTN, and the scheme can be less complex. See FIG. 3 or 7 for example.

Another such additional feature is where the dual homing is at both the ingress nodes and the egress nodes, and there are paths from each of the ingress nodes to each of the egress nodes, the selecting step comprising selecting which egress node to use for the traffic, according to the status of the attachment circuits. See FIG. 5, 7 or 11 for example Another such additional feature is where there is dual homing at the egress nodes, the sending step comprising feeding back the indication along the paths, to other nodes along the paths. See FIG. 10 or 12 for example.

Another such additional feature is the communications network providing paths for traffic in both directions between the source and destination client entities, and having the step of sending in both directions the indications of operational status in overhead associated with the traffic and sent with the traffic. See FIGS. 10 and 12 for example.

Another additional feature of some embodiments is where there is dual homing at the ingress, and the steps of sending the traffic along one of the attachment circuits at the ingress, and along the working path within the optical network, detecting a fault in this attachment circuit, setting the status of this attachment circuit as being faulty, sending the traffic along another of the attachment circuits to a different ingress node, setting the status of this other attachment circuit as being active and sending the changed status of the attachment circuits from the corresponding ingress node to other nodes. See FIGS. 14 and 15 for example.

Another such additional feature is the method having the steps of detecting a fault in the working path in the optical transport network, selecting the protection path for the traffic, and selecting a different attachment circuit of the dual homed attachment circuits, setting the status of this different attachment circuit as being active and sending the changed status of the attachment circuits from the corresponding ingress or egress node to other nodes. See FIGS. 16 to 27 at least, for example.

Another aspect provides a computer program on a computer readable medium having instructions which when executed by a processor cause the processor to control the steps of any of the methods set out above.

Another aspect provides a node configured to operate at least as an ingress node of an optical transport network for use in a communications network, the communications network being arranged to provide paths for traffic extending from a source client entity to a destination client entity via the optical transport network, to provide at least one attachment circuit for coupling the source client entity to corresponding ingress nodes of the optical transport network, and to provide at least one attachment circuit at the egress, for coupling corresponding egress nodes of the optical transport network to the destination client entity. The attachment circuits comprise dual homed attachment circuits at least at the ingress nodes. The paths comprise paths within the optical transport network, to couple respective pairs of the ingress and egress nodes. The node has a mapper for receiving client traffic from the dual homed attachment circuit and mapping client traffic into containers for sending over the optical transport network. An overhead circuit is provided for inserting an indication of an operational status of at least one of the dual homed attachment circuits into overhead associated with the traffic. An output circuit is provided configured to output the overhead with the indication within, with the traffic to other nodes along the paths.

Another aspect provides a node configured to operate at least as an egress node of an optical transport network for use in a communications network, the communications network being arranged to provide paths for the traffic extending from a source client entity to a destination client entity via an optical transport network, to provide at least one attachment circuit for coupling the source client entity to corresponding ingress nodes of the optical transport network, and to provide at least one attachment circuit at the egress, for coupling corresponding egress nodes of the optical transport network to the destination client entity, the attachment circuits comprising dual homed attachment circuits at least at the ingress nodes, and the paths comprising paths within the optical transport network, to couple respective pairs of the ingress and egress nodes. The node has an input circuit for reading indications of operational status of the dual homed attachment circuits, the indication being within overhead associated with the traffic, and sent with the traffic and a controller for selecting which of the provided working paths, protection paths and attachment circuits to use for the traffic, based on the indication of operational status of the attachment circuits sent through the optical transport network, to protect the traffic against a fault in the attachment circuits or in the optical transport network.

An additional feature of some embodiments is the node being configured to receive an indication of a fault in the paths in the optical transport network and the controller being configured to select based also on the fault indication. Another such additional feature is the indication having an indication of a protection status, and an indication of a fault status. Another such additional feature is the dual homing being at the ingress and egress, and paths being provided from each of the ingress nodes to more than one of the egress nodes, the controller being configured to cooperate with other egress nodes to select which of the egress nodes to use for the traffic, according to the status of the attachment circuits.

Another such additional feature is the node being operable as an ingress node, and as an egress node as set out above.

Another aspect provides an optical transport network, having a node configured to operate as an ingress node as set out above, and another node configured to operate as an egress node as set out above.

Another aspect provides a signal in a non transitory transmission medium of an optical transport network, the signal comprising overhead associated with traffic in the transmission medium, the overhead being sent with the traffic, the overhead having an indication of the operational status of a dual homed attachment circuit, the status including a standby status when said dual homed attachment circuit is not active and no fault is present, said dual homed attachment circuit being configured to couple a source client entity to an ingress node of the optical transport network.

Any of the additional features can be combined together and combined with any of the aspects. Other effects and consequences will be apparent to those skilled in the art, especially over compared to other prior art. Numerous variations and modifications can be made without departing from the claims of the present invention. Therefore, it should be clearly understood that the form of the present invention is illustrative only and is not intended to limit the scope of the present invention.

BRIEF DESCRIPTION OF THE DRAWINGS

How the present invention may be put into effect will now be described by way of example with reference to the appended drawings, in which:

FIG. 1 shows a schematic view of a communications network with dual homed attachment circuits to an OTN network, FIGS. 2 and 3 show schematic views of OTN network nodes according to embodiments, FIGS. 10, 11 and 12 show a network view and corresponding method steps for a first scenario before any fault, according to embodiments, FIGS. 13 and 14 show a view of the network of FIG. 10 following a fault in an attachment circuit as a second scenario, and corresponding method steps, FIG. 15 shows a network view for a third scenario, involving a fault on an OTN protection path, FIGS. 16 to 18 show network views and corresponding method steps for a fourth scenario, involving a fault on a working OTN path, FIGS. 19 to 21 show network views and corresponding method steps for a fifth scenario, involving a fault on working OTN paths in two directions, FIGS. 22 to 24 show network views and corresponding method steps for a sixth scenario, involving a fault on working OTN paths in two directions followed by a fault in an attachment circuit, FIGS. 25 to 27 show network views and corresponding method steps for a seventh scenario, involving a fault in an attachment circuit followed by faults on working OTN paths in two directions, and FIG. 28 shows a view of the network of FIG. 10 in an eighth scenario, involving a fault on an OTN node.

DETAILED DESCRIPTION

Figure 3:
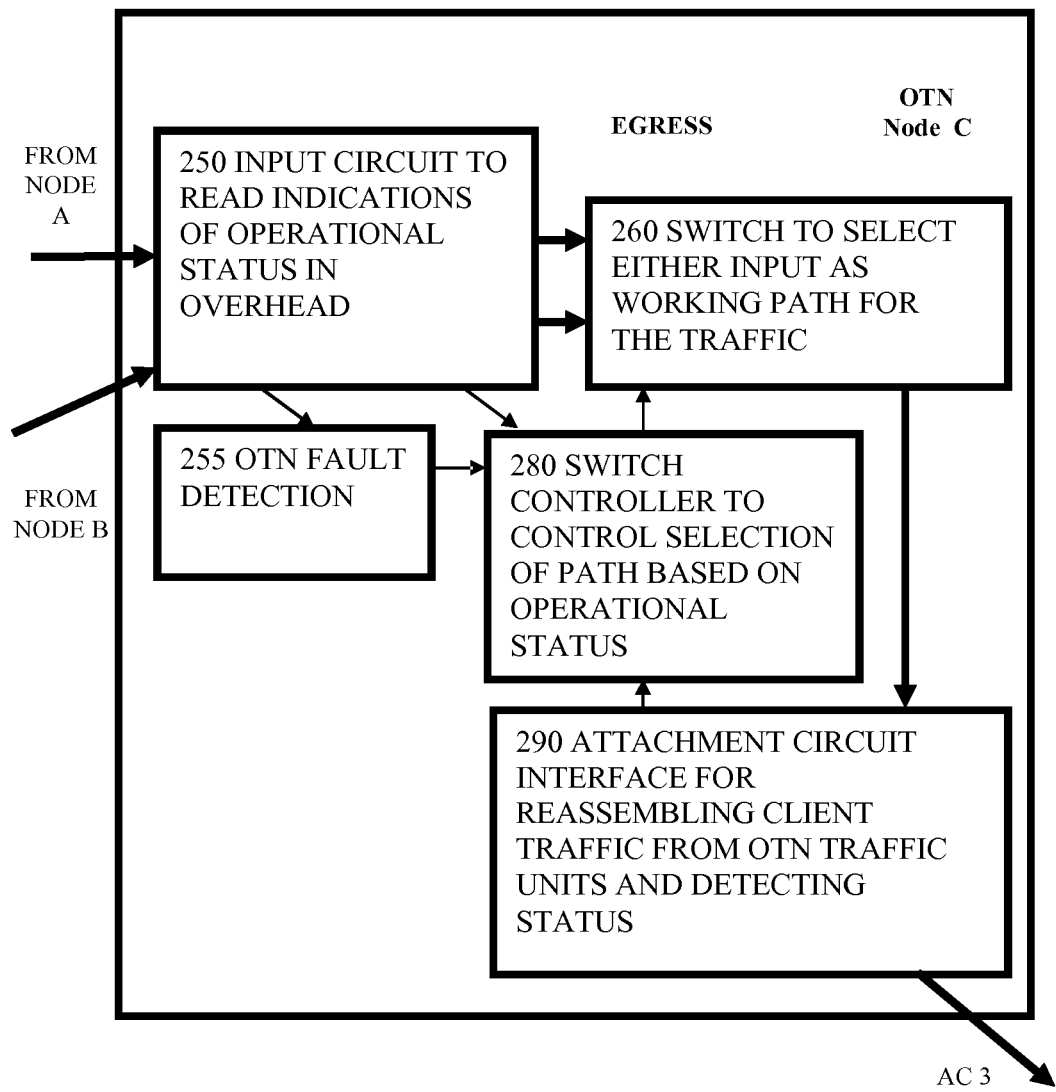

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn to scale for illustrative purposes.

Abbreviations
AC Attachment circuit
CE Customer Edge
CBR Constant Bit Rate
CSF Client signal fail
LAG Link Aggregation Group
MC Multi Chassis
HO-ODUk High Order ODUk
OAM Operations, admin, maintenance
ODUk Optical Data Unit
OH Overhead
OTN Optical Transport Network
OTUk Optical Transport Unit
SNC Sub-Network Connection
SNC/I SNC with Inherent monitoring
SNC/N SNC with Non-intrusive monitoring Definitions:
AC: "An attachment circuit (AC)" is any physical link that attaches a Customer Edge (CE) to a Provider Edge PE. i.e a Customer Equipment to an OTN node in this document.
UP AC: An AC that is not in any defect state.
Active AC: An UP AC that is selected for forwarding user traffic
Standby AC: An UP AC that is not used for forwarding user traffic
Down AC: An AC that is in any defect states.
MC: Multi Chassis, a protocol for edge nodes to cooperate to control and select corresponding dual homed attachment circuits to provide redundancy.

References to protection are intended to encompass any kind of protection arrangements, such as for example arrangements where the protection path is switched at a far end, at a near end, or at both ends, and to static or dynamic protection paths, and to arrangements having fully or partially diverse paths, and so on.

References to dual homed are intended to encompass arrangements having attachment circuits to different edge nodes of the OTN, configured to enable traffic to be sent or received over any one or distributed between them for example.

Where the term "comprising" is used in the present description and claims, it does not exclude other elements or steps and should not be interpreted as being restricted to the means listed thereafter. Where an indefinite or definite article is used when referring to a singular noun e.g. "a" or "an", "the", this includes a plural of that noun unless something else is specifically stated. Elements or parts of the described nodes or networks may comprise logic encoded in media for performing any kind of information processing. Logic may comprise software encoded in a disk or other computer-readable medium and/or instructions encoded in an application specific integrated circuit (ASIC), field programmable gate array (FPGA), or other processor or hardware. References to nodes can encompass any kind of switching node, not limited to the types described, not limited to any level of integration, or size or bandwidth or bit rate and so on.

References to OTN are intended to encompass any kind of optical transport network, not limited to those of any particular up to date standard, capacity, multiplex technology or frequency for example.

References to software can encompass any type of programs in any language executable directly or indirectly on processing hardware.

References to processors, hardware, processing hardware or circuitry can encompass any kind of logic or analog circuitry, integrated to any degree, and not limited to general purpose processors, digital signal processors, ASICs, FPGAs, discrete components or logic and so on. References to a processor are intended to encompass implementations using multiple processors which may be integrated together, or co-located in the same node or distributed at different locations for example.

Introduction, FIG. 1.

By way of introduction to the embodiments, how they address some issues with conventional designs will be explained. FIG. 1 shows at least part of a communications network including a source of client traffic, client entity CE1 and a destination for the client traffic, CE 2, coupled by paths extending through an OTN network 5. The OTN network has edge nodes A and B which may operate as ingress nodes, and edge node C which may operate as an egress node, at least for the traffic from CE1 to CE2. There may be many intermediate nodes in the OTN network, which need not be shown here for the sake of clarity. Nodes are coupled by a transmission medium, typically implemented as optical fibers for carrying traffic as data modulated on one or more wavelengths. Edge nodes in some embodiments may be capable of and configured to carry traffic in both directions, in which case they can operate as ingress and egress nodes, and more detailed examples of such operations will be described below, but for the sake of clarity, a simpler one directional example will be described first.

In FIG. 1, CE1 is dual homed with OTN Node A and OTN Node B by means of attachment circuits AC1 and AC2 respectively. CE2 is single homed with OTN Node C by means of attachment circuit AC3. By mean of a Multi chassis protocol (such as for instance a MC-LAG protocol in case of Ethernet interfaces) the CE1 client traffic is selected from AC1 or AC2. Multi-Chassis LAG is a type of Link Aggregation where ports are terminated on different chassis, in order to provide node redundancy. MC-LAG is under definition by IEEE standard as Distributed Resilient Network Interconnect (DRNI). With MC-LAG one of the links from CE1 acts as 'active' while the other as 'standby'. LACP (Link Aggregation Control Protocol) is used to set the active and standby links and distribute traffic accordingly.

It is assumed that the two nodes A and B are communicating amongst each other so that redundancy mechanism can operate correctly. A Multi Chassis (MC) communication protocol is used for this purpose (a standard definition of this protocol does not exist; an application for MPLS networks is going to be defined by IETF). Traffic flows from CE1 to CE2 and is transported over OTN network. There are multiple paths provided through the OTN network from the ingress nodes, to form a working path and a protection path. But to enable efficient protection switching in the event of a fault, the protection switching within the OTN network needs to be integrated with the protection provided by the dual homed attachment circuits to the two ingress nodes. An example of how this can be achieved according to an embodiment of the invention, will now be described with reference to FIGS. 2 and 3.

FIGS. 2, 3, Ingress and Egress Nodes of the OTN Network of FIG. 1

FIG. 2 shows a schematic view of a node A acting as an ingress node, FIG. 3 shows a schematic view of node C acting as an egress network in FIG. 1. The operation in summary involves signalling from the ingress nodes to the remote OTN nodes along the path, particularly the egress node, the operational status of the attachment circuits AC1 and AC2 at the ingress. This enables the egress node to alter its selection of path for the traffic based on the operational status, so that the traffic can be protected from AC failure. To enable also protection from OTN failure, such as ODUk failure, the egress node should be able to detect such a failure and react by selecting a protection path within the OTN network (for example from node A to node B to node C), or by causing a different attachment circuit to be used at the egress (if available, see FIG. 5 for example) or at the ingress (AC1 or AC2) for example. In the latter case the egress node would need to convey the signal fail status detected in its path termination sink function in the upstream direction towards the corresponding ingress node to enable the ingress nodes to change the status of their ingress attachment circuit. This enables protection inside and outside the OTN network to be integrated in one arrangement or system, rather than having separate independent protection schemes for the parts of the paths inside and outside the OTN network. This helps to avoid the need for complex interworking or control by means of a control plane, which would be much more complex to administer and slower to operate. One way to implement the signaling is to use the EXP byte of the LO-ODUk OH in order to pass the operational status information through the OTN network in the overhead sent with the traffic. This helps minimize the amount of overhead by avoiding the need to indicate which traffic the operational status information applies to. This is implicit if the status is carried in overhead sent with the traffic it relates to. Notably there is no need to use ODU SNCP, though if ODU SNCP is configured, a hold-off timer can be used to coordinate ODU SNCP and the dual homed CE protection switching described. This can ensure compatibility with ODU SNCP schemes.

FIG. 2 shows node A having circuitry 200 for receiving AC1 from CE1, and mapping the client traffic into OTN traffic units. Circuitry 210 is provided to communicate with node B using any kind of multi chassis MC protocol, to enable control of which of attachment circuits AC1 and AC2 to use for the traffic, and therefore set or detect the operational status of AC1. An indication of such operational status can then be added to the overhead by circuitry 220 for inserting information into the overhead before transmission along the path through the OTN, ultimately to the egress node. Node B can have a similar arrangement to that shown for node A.

FIG. 3 shows a schematic view of an example of node C acting as an egress node. Circuitry 250 is an input circuit for receiving traffic with overhead from node A and node B. The circuitry is configured to read the indications of operational status of at least attachment circuit AC1 in the overhead from node A, and read the operational status of at least attachment circuit AC2 in the overhead from node B. The operational status can indicate for example which of the attachment circuits is active in the sense of being used as the working path, and which is standby, meaning the protection path. Conceivably both are active and the decision as to which to use is controlled by the egress node. Also the status can optionally be used to indicate whether the AC is faulty, which is useful for the standby path, to know whether it is able to be switched in as the working path if needed. Node C selects whichever incoming path has an active indication, showing that its corresponding AC (AC1 or AC2 at the ingress), is active.

If the AC is Down (as described in more detail below with reference to various scenarios) a change in status of the ACs should be triggered, carried out for example by the MC-LAG protocol operating between A and B.

A switch 260 is provided to select which of the input paths to select for the traffic to be output to the destination via AC3. A switch controller 280 is configured to control the switch based on amongst others, the operational status read from one or both of the input overheads. Optionally OTN fault detection is provided by fault detection part 255 and in some cases the switch control can be based also on the OTN fault detection. An AC circuit interface 290 is provided to reassemble the client traffic from the received OTN traffic units fed by the switch 260, without all the overhead, for sending on over AC3. This interface may also be used to detect the status of AC3 for reporting back along the path.

Figure 4:
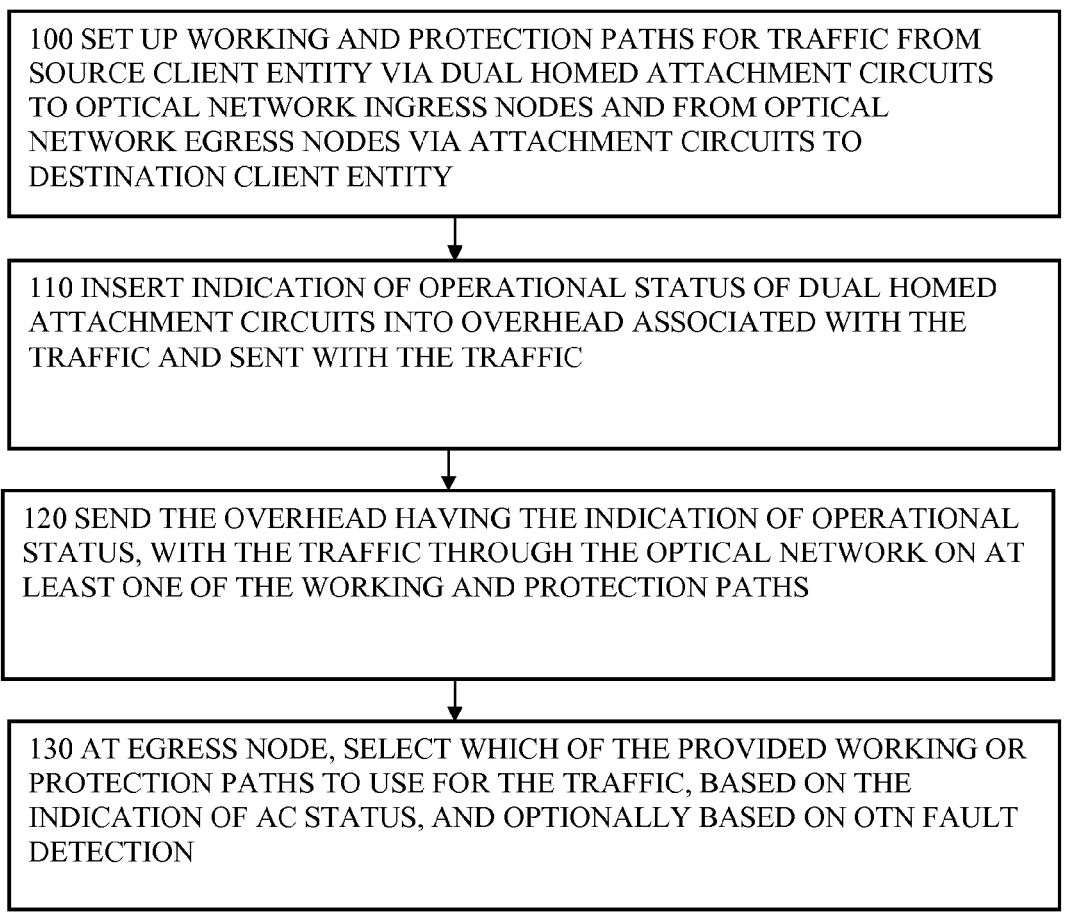
FIG. 4 shows steps according to an embodiment of a method of protecting traffic.

FIG. 4, Operational Steps According to an Embodiment

FIG. 4 shows steps in operation according to an embodiment, using the communications network and nodes shown in FIGS. 1 to 3 for example, or using other features. At step 100, working and protection paths are set up for the traffic from the source client entity via dual homed attachment circuits to OTN ingress nodes and out from OTN egress nodes via one or more attachment circuits to the destination client entity. At step 110 indications of operational status of the dual homed attachment circuits are inserted into the overhead associated with the traffic and sent with the traffic.

At step 120 this overhead is sent with the traffic across the OTN network on at least one of the working and protection paths, usually both. Referring to FIG. 1 for instance, Node A sends the AC1 operational status to Node C and in the example of FIG. 10 it is sent also to node D. If the link between A and D fails, node D has no way to read the AC1 operational status from node A, but node C can read it. At step 130, at the egress node, a selection is made of which of the provided OTN working or protection paths to use for the traffic, and a selection of which of the attachment circuits to use where there is dual homing, at the ingress or egress or both. This selection can now be based on the indication of operational status of the dual homed attachment circuits, from both ingress and egress ends. Optionally it can also be based on OTN fault detection. This can encompass feeding the status back along the path if the egress is dual homed, or feeding it forward along the path if the ingress is dual homed.

In principle it is not forbidden for an intermediate node to monitor the LO-ODUk information relating to the AC operational status and make path selection decisions, but it is usually more practical for the end nodes at egress and ingress to make all such selection decisions. Otherwise any action by the intermediate nodes for ODU protection switching/rerouting using AC operational status information or LO-ODU Signal fail implies another protection scheme which would need to be coordinated with the end nodes anyway and hence adds complexity and delay. Hence, usually, having the intermediate nodes along the path operate transparently to the actions and information flows for protection described here is the preferred implementation example.

Figure 5:
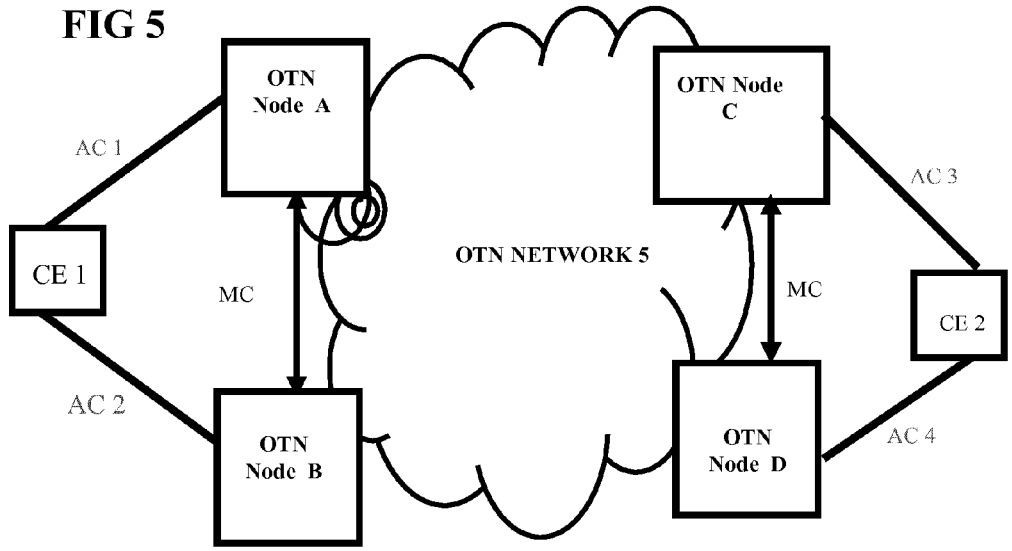
FIG. 5 shows a schematic view of a communications network with dual homed attachment circuits at ingress and egress to an OTN network.
Figure 6:
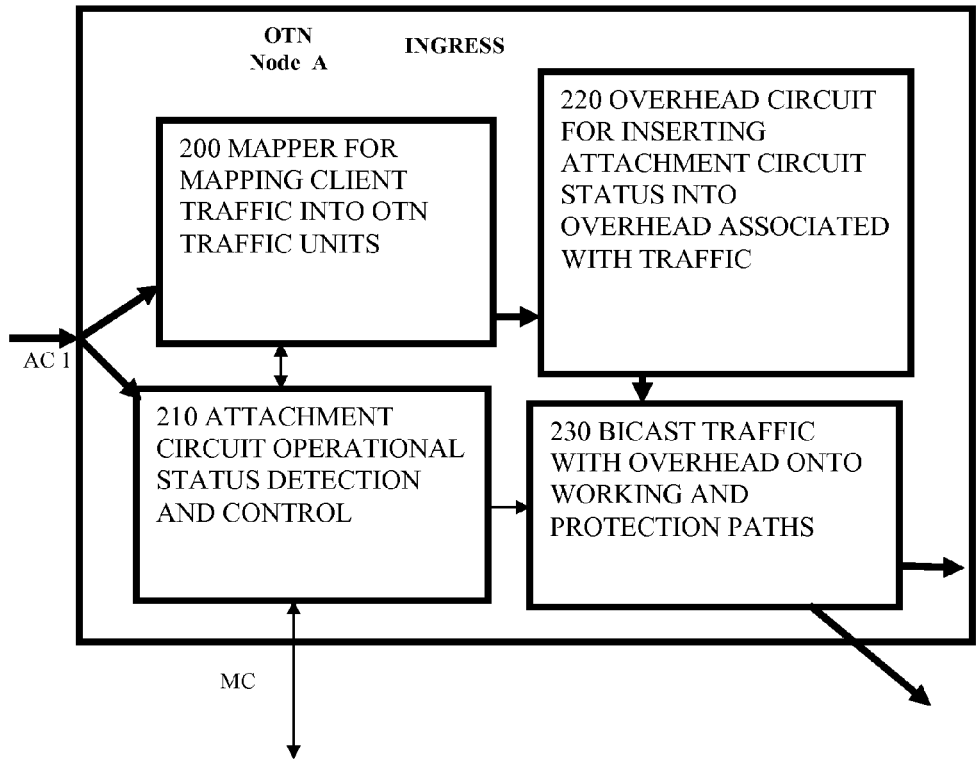
FIGS. 6 and 7 show schematic views of OTN network nodes according to embodiments having bicasting and selection of path within the OTN network.
Figure 7:
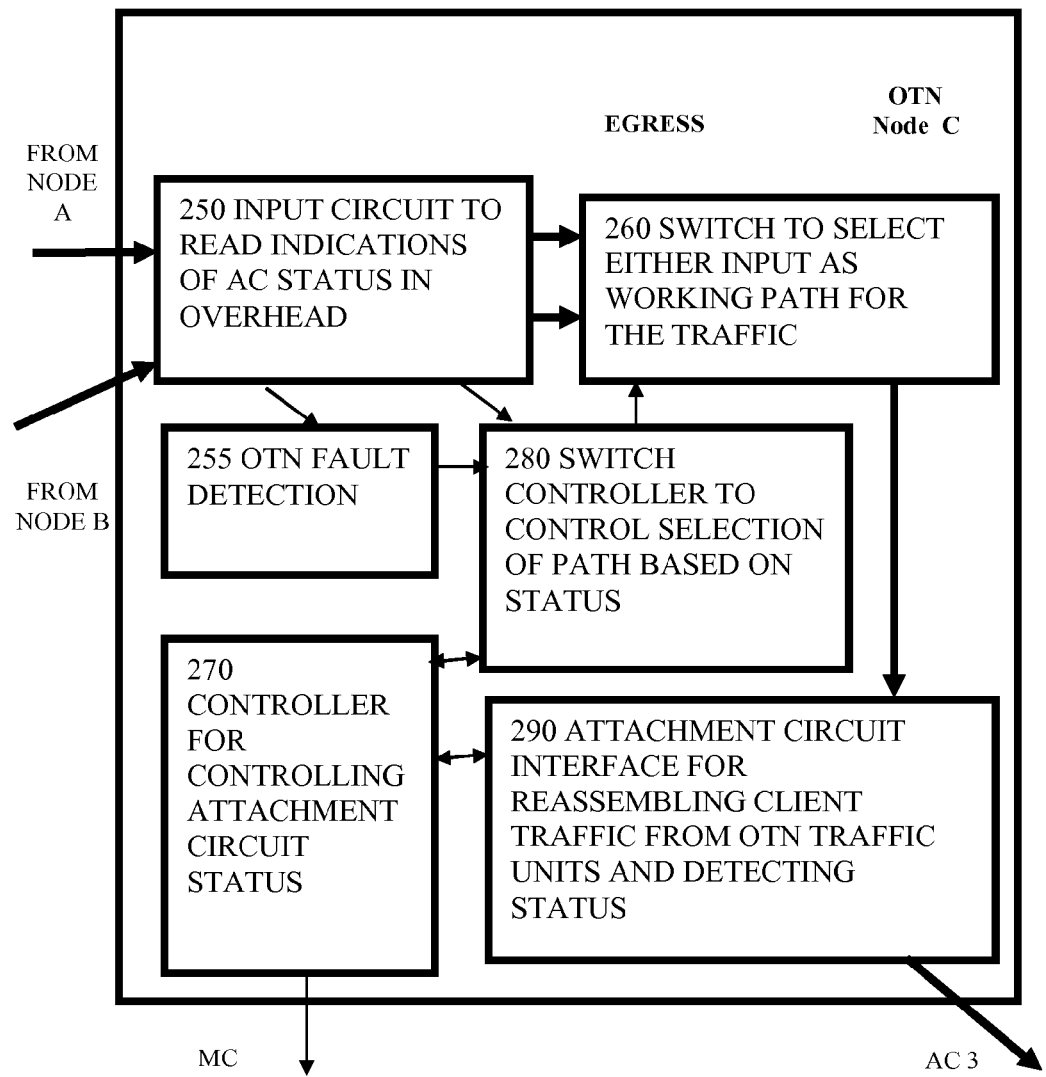

FIGS. 5, 6 and 7, Embodiments Having Dual Homing at Ingress and Egress FIG. 5 shows a schematic view of a communications network with dual homed attachment circuits at ingress and egress to an OTN network, and FIGS. 6 and 7 show schematic views of OTN ingress and egress nodes according to embodiments having bicasting and selection of path within the OTN network. FIG. 5 shows a schematic view similar to that of FIG. 1, but with the addition of dual homing at the egress. Node D is provided to operate as another egress node, with a corresponding attachment circuit AC4 to the destination CE2. Another similar multi-chassis arrangement MC is used to enable egress nodes C and D to cooperate to decide which of the egress attachment circuits AC3 or AC4 to select. This gives a further level of redundancy to protect against faults at the egress side. In principle there can be embodiments having single homing at the ingress and dual homing at the egress.

FIG. 6 shows a schematic view of an embodiment of node A of FIG. 5 for operation as an ingress node. This is similar to the view of FIG. 2, and similar reference signs have been used as appropriate. In addition there is circuitry 230 for bicasting the traffic over two paths each to a different egress node, node C and D respectively in this case.

FIG. 7 shows a schematic view of an embodiment of node C of FIG. 5 for operation as an egress node. This is similar to the view of FIG. 3, and similar reference signs have been used as appropriate. In addition there is circuitry for a controller 270 for controlling the attachment circuit status. This cooperates with node D using the MC protocol described above to decide which of the egress attachment circuits AC3 and AC4 to use for the traffic and to set the status accordingly, or to set a fault status if this is detected by part 290. An indication of which AC is used, or of AC operational status, is also passed to the switch controller 280, for use in deciding which OTN input to use. The controller also has an input to receive the ingress AC operational status indication, from the input circuit 250, optionally via the switch controller for convenience.

Also shown is circuitry 255 for OTN fault detection, coupled to the input circuit 250. This information can be taken into account by the AC controller 270 in some embodiments in deciding which egress AC to use, and/or in deciding which OTN path to use, though the controllers could make these selections without this additional information. Again this information can be passed to the AC controller 270 via the switch controller for convenience.

Figures 8, 9:
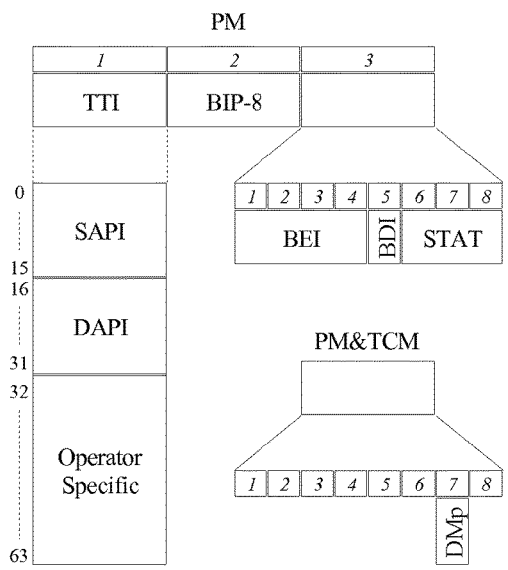
FIGS. 8 and 9 show schematic views of arrangements of overhead in the OTN signal.

FIGS. 8 and 9, Arrangements of Overhead in the OTN Signal,

FIG. 8 shows an arrangement of OAM overhead for a G.709 OTN. This is typically one part of a frame having OAM overhead, payload and OTU FEC parts. The OAM overhead has framing and OTU OH in row 1, OPU overhead at the end of all four rows, and ODU OH in columns 1 to 15 of rows 2, 3 and 4. This figure shows rows 2,3 and 4 used for low order LO ODUk overhead, which includes at columns 10 to 13 information for path monitoring, (shown in more detail in FIG. 9) and at columns 13 and 14, two bytes allocated in the ODUk overhead for experimental use. The other parts shown are well known and not relevant to the present discussion and so need not be described here in more detail other than by making reference to the G.709 standard. The ODUk EXP byte row 3, column 13 can be used to convey to remote OTN nodes the AC status using for example the following values:

DOWN: 0x00
UP: 0x01
ACTIVE: 0x02
STANDBY: 0x03

Other values could be used for this information and other operational status information can optionally be used.

The path monitoring indications shown in more detail in FIG. 9 can be used for the OTN fault detection, following conventional practice. As this is well known, it need not be described here in more detail other than to make reference to the G.709 standard again as an example, and any other kind of fault detection could be used instead or as well.

Figure 10:
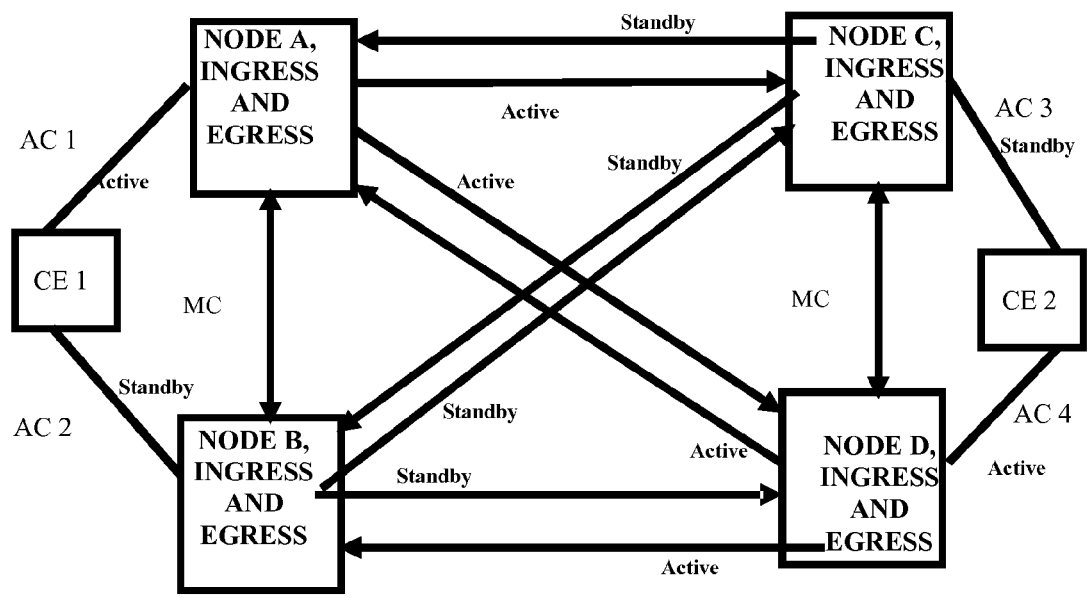
Figure 11:
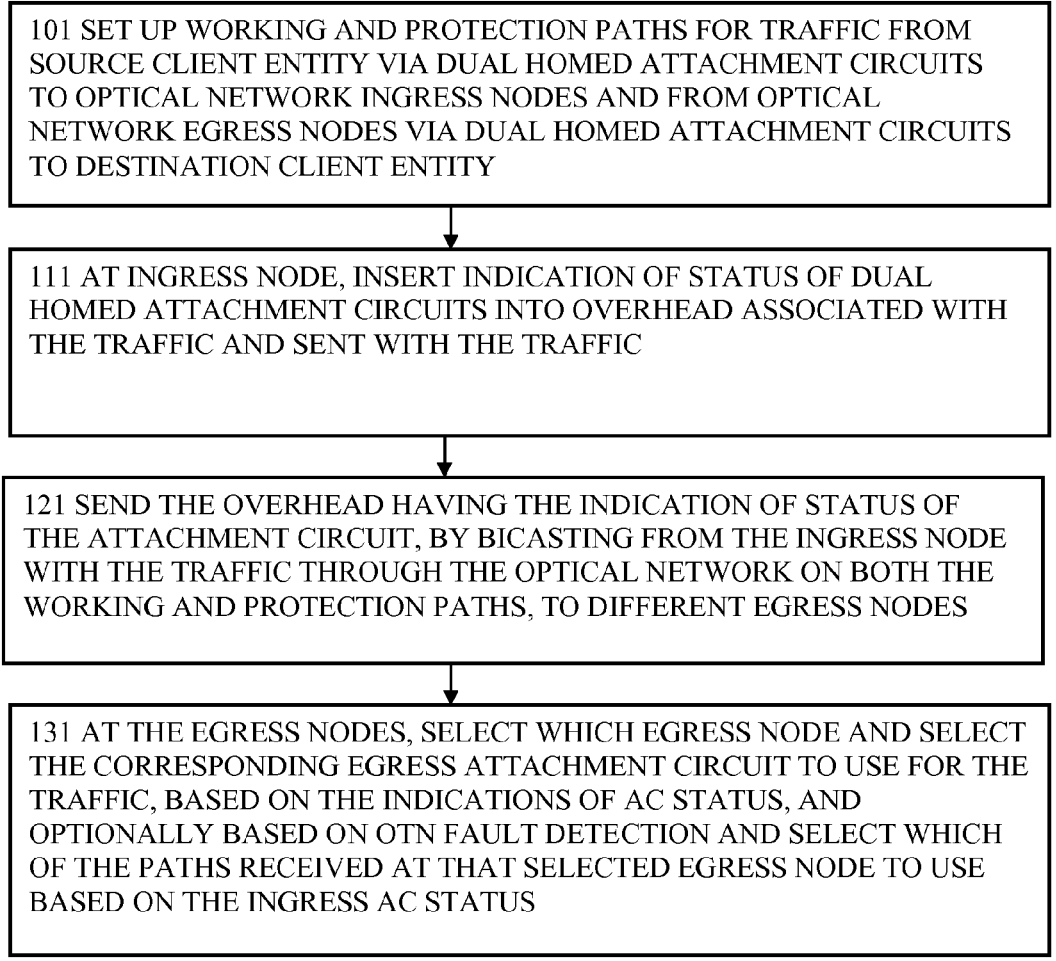

FIGS. 10, 11 and 12 a First Scenario Before any Fault, According to Embodiments, FIG. 10 shows a schematic view of a communications network with an OTN network similar to that of FIG. 5, with nodes A, B, C and D, and dual homing at ingress and egress. Paths between these edge nodes are shown in both directions, so all four edge nodes are each operated as ingress and egress nodes. The status of each of AC1, AC2, AC3 and AC4 is shown, with AC1 and AC4 being active and the other two being standby. The OTN paths between the nodes each are shown with a status indication, which represents not the status of that OTN ODUk but the operational status of the attachment circuit leading to that part of the path. So for example AC1 is active and so paths from node A to nodes C and D are shown as active, because they are carrying in their overhead the indication that AC1 is active. Correspondingly, the paths from node C to nodes A and B are shown as standby because they are carrying in overhead an indication that AC3 has standby status. In FIG. 10, ODUk carrying active status are those from Node A and Node D: so the traffic flows from AC1 to Node A to Node D to AC4 (and may flow in both directions along this route).

FIG. 11 shows steps in operation of the communications network shown in FIG. 10 for a first scenario without any fault indication. At step 101, there is a step of setting up working and protection paths for traffic from the source client entity via dual homed attachment circuits to optical network ingress nodes and from optical network egress nodes via dual homed attachment circuits to the destination client entity. At step 111 at each of the ingress nodes, an indication of the operational status of the corresponding dual homed attachment circuit is inserted into overhead associated with the traffic and sent with the traffic. The overhead having the indication of operational status of the attachment circuit, is sent at step 121 by bicasting from each of the ingress nodes with the traffic through the optical network on both of the paths, to different egress nodes, C and D. At step 131 at the egress nodes, which egress node and the corresponding egress attachment circuit is selected for use for the traffic, based on the indications of status from both ends and optionally based on any OTN fault detection. At the selected egress node, which of the OTN paths received at that selected egress node to use is selected, according to which is carrying an active status indication relating to its corresponding Active ingress AC and potentially also according to any OTN fault detection. Node D selects ODUk from Node A because the path is carrying active indication and because also AC4 is Active. Note also that the path between A and C is carrying the Active ingress AC indication but node C detects that AC3 is standby so the path from A to C is not selected.

FIG. 12 shows a similar series of steps, for bidirectional traffic. At step 102, there is a step of setting up working and protection paths for traffic from the source client entity via dual homed attachment circuits to optical network ingress nodes and from optical network egress nodes via dual homed attachment circuits to the destination client entity, in both directions. At step 112 for both directions, at the respective ingress nodes, an indication of the operational status of the corresponding dual homed attachment circuit is inserted into overhead associated with the traffic and sent with the traffic. The overhead having the indication of operational status of the attachment circuit, is sent at step 122 by bicasting from each ingress node with the traffic through the optical network on both the paths, to different egress nodes, C and D, and in the other direction, to A and B. At step 132, for both directions, at the egress nodes, which egress node and the corresponding egress attachment circuit to use for the traffic, is selected based on the indications of status from both ends and optionally based on any OTN fault detection. At the selected egress node, which of the OTN paths received at that selected egress node to use is selected, according to which is carrying an active status indication relating to its corresponding Active ingress AC, and potentially according to any OTN fault detection. At the egress nodes, the new status of the egress attachment circuits is inserted into the overhead sent back in the reverse direction, to feed back the operational status. through the OTN network. An example is described with reference to FIG. 18 below.

It is assumed that the traffic in both directions takes the same path in the OTN network, but in principle each direction could take a different path.

As shown, AC1 and AC2 have UP status, meaning no faults. By means of an MC protocol running among Node A and Node B, AC1 is declared "Active" and AC2 is declared "Standby". AC3 and AC4 also have UP status. By means of a MC protocol running among Node C and Node D, AC3 is declared "Standby" and AC4 "Active".

AC1 Client traffic is mapped into LO-ODUk by Node A and "bicasted" towards Node B and Node D. The AC1 "Active" status is signaled into the EXP field of LO-ODUk OH. Edge nodes are arranged to trigger the change of the ACs in the LAG if one of the following events occurs:

Its own Active AC fails and the other AC in the same LAG is NOT in the "Down" State
  The input circuitry 250 acting as an egress node sink function detects failures on the ODUk carrying AC traffic and the other AC in the same LAG is NOT in "Down" State Nodes select traffic from the LO-ODUk carrying AC "Active" State information in the Exp byte both in Transmit and Receive directions. The ODUk failure criteria can be the same criteria used for SNCP ODU protection (G.798 . . . )

Figure 14:
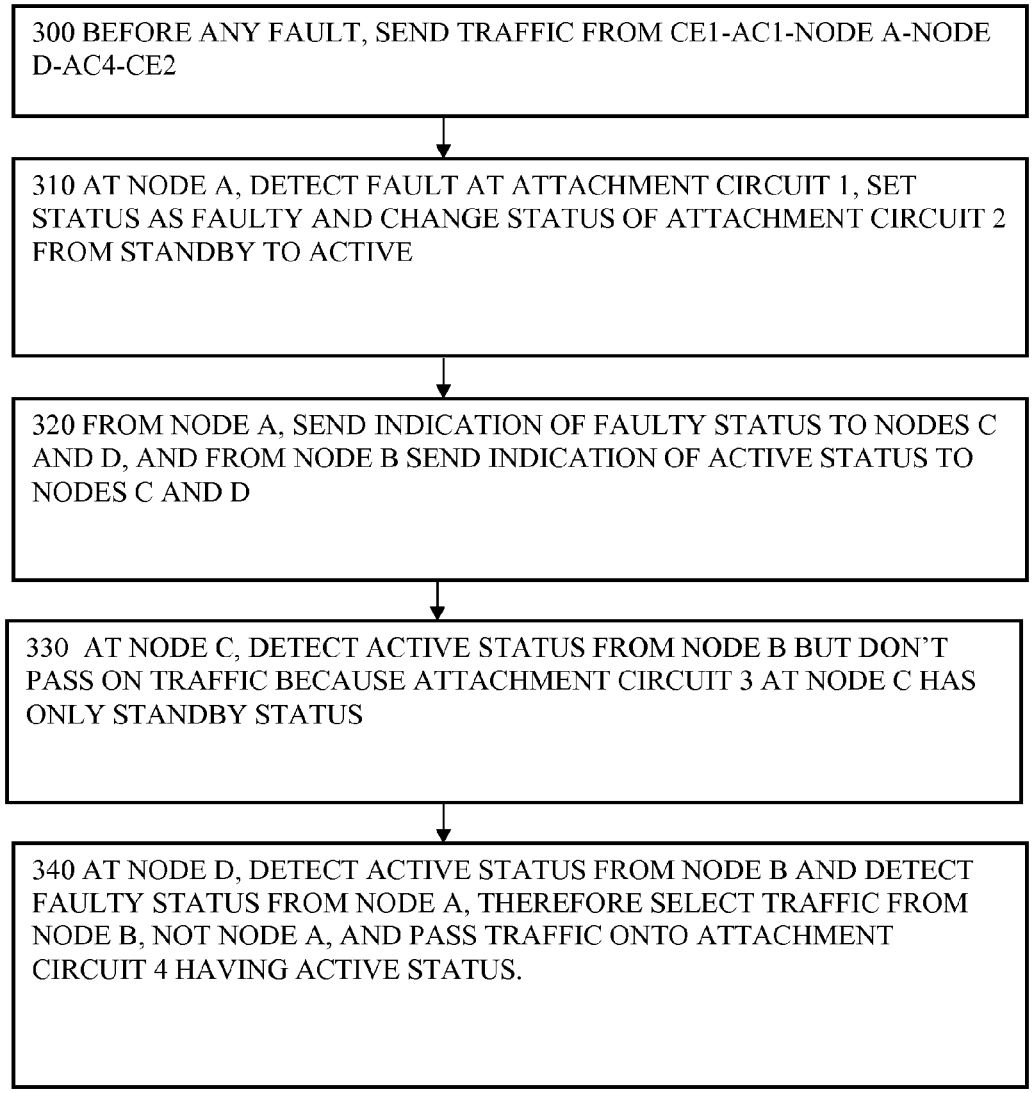

FIGS. 13, 14, Second Scenario a Fault in an Attachment Circuit Used by Traffic,

FIG. 13 shows a network view following a fault in AC1. Before any fault the operation is as in FIGS. 10 to 12. The protection switching operation is shown in FIG. 14. At step 300, before any fault, traffic is sent from CE1-AC1-node A-node D-AC4-CE2. At step 310, at node A, a fault is detected at attachment circuit 1, operational status as DOWN (faulty) and the operational status of attachment circuit 2 is changed from standby to active. At step 320 from node A, the indication of faulty status is sent to nodes C and D, and from node B the indication of active status is sent to nodes C and D. At node C, active status from node B is detected at step 330, but this node does not pass on traffic because attachment circuit 3 at node C has only standby status.

At step 340 at node D, the active status from node B and the faulty status from node A are detected, and therefore traffic from node B, not node A is selected and passed onto attachment circuit 4 having active status. So, as shown in FIG. 13, traffic now flows AC1-node A-node D-AC4.

In other words, before the fault AC1 Client traffic is mapped into LO-ODUk by Node A and "bicasted" towards Node C and Node D. The AC 1 "Active" status is signaled using the EXP field of LO-ODUk OH. AC2 Client traffic is mapped into LO-ODUk by Node B and "bicasted" towards Node C and Node D. The AC 2 "Standby" status is signaled into the EXP field of LO-ODUk OH. AC3 Client traffic is mapped into LO-ODUk by Node C and "bicasted" towards Node A and Node B. The AC 3 "Standby" status is signaled into the EXP field of LO-ODUk OH. AC4 Client traffic is mapped into LO-ODUk by Node D and "bicasted" towards Node A and Node B. The AC 4 "Active" status is signaled into the EXP field of LO-ODUk OH. Each OTN egress (sink) node selects the traffic from the ODUk received with EXP field signalling AC Active state and which relative source ODUk signals AC Active state. Thus the selection of path within the OTN and selection of the AC is based on the AC operational status sent through the network.

On failure of the AC1, this is detected by node A, and by means of the MC protocol running among Node A and Node B, AC1 is declared "Down" and AC2 is declared "Active". A CSF indication already foreseen by the G.709 standard could be used instead of the EXP bits to indicate this active status even though it does not have an explicit "Standby" state of an AC. The fail indication of the CSF bit could be used as a standby indication. The changed AC1 "Down" state is signaled into the EXP field of LO-ODUk OH by Node A while the AC2 "Active" state is signaled by Node B. This change of the operational status is detected at nodes C and D, and forces Node D to select ODUk from node B. Traffic now flows from AC2 to Node B to Node D to AC4.

FIG. 15 Third Scenario, Involving a Fault on an OTN Protection Path

FIG. 15 shows the network of FIG. 10 in a scenario with a fault on an OTN protection path, the fault being shown in one direction only though it could be a fault in both directions. FIG. 15 shows the network before or after the fault is detected, since there is no protection switching carried out in this case. Since the unidirectional failure or the bidirectional failure is on a path that is NOT carrying traffic, then for example Node C detects a failure on the LO-ODUk egress (sink) function. That path however is not carrying traffic as the associated source LO-ODUk is signaling "Standby" AC status, to indicate the standby status of AC3. In this case no rerouting traffic action is performed by Node C, nor by node A. Traffic would still flow AC1-Node A-Node D-AC4.

Figure 17:
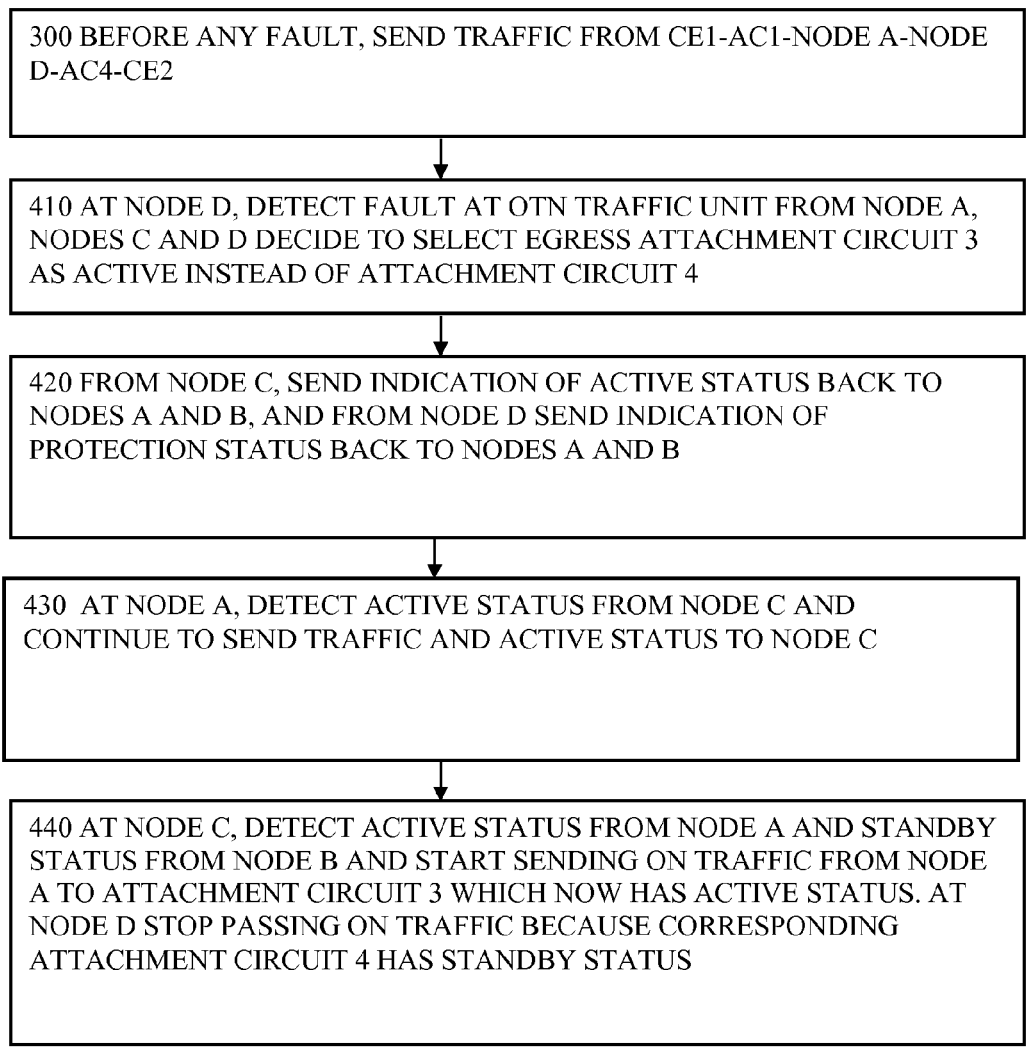

FIGS. 16 to 18 Fourth Scenario, Involving a Fault on a Working OTN Path

FIG. 17 shows method steps for operation using the network of FIG. 10 in a scenario with a fault on a working OTN path, the fault being in one direction only. FIG. 16 shows the network with the fault but before the fault is detected and FIG. 18 shows the network after the fault detection and after the protection switching. At step 300, before any fault, traffic is sent from CE1-AC1-node A-node D-AC4-CE2. At step 410, at node D, a fault on OTN traffic unit from node A, is detected, and nodes C and D decide to select egress attachment circuit 3 as active instead of attachment circuit 4. At step 420, from node C, the indication of active status is sent back to nodes A and B, and from node D the indication of protection status is sent back to nodes A and B. At node A, at step 430, the active status from node C is detected and node A continues to send traffic and active status to node C. At step 440 at node C, the active status from node A is detected and the standby status from node B is detected and traffic is sent from node A to attachment circuit 3 which now has active status. Node D stops passing on traffic because the corresponding attachment circuit 4 has standby status.

In other words, when egress (sink) Node D detects a failure on LO-ODUk received from node A, the MC protocol is used and AC4 is driven into "Standby" and AC3 into "Active" state. The changed AC4 "Standby" status is signaled into the EXP field of LO-ODUk OH by Node D while the AC3 "Active" state is signalled by Node C. Traffic flows from AC1 to Node A to Node C to AC3 as shown in FIG. 18.

In another example with a similar behavior, starting from the situation in FIG. 18, node A can trigger the change of AC1 and AC2 operational status using the LAG after receiving a backward indication from node D of a failure of the working OTN path from node A to node D. Such a backward indication can be implemented for example using the backward defect indication (BDI) carried into the OH of the associated LO-ODUk HO. A result of this is that AC1 would go into standby, and AC2 would become active, and traffic would flow from AC2 to node B to node C to AC3. This is an example of node D causing the traffic to flow on a different ingress AC, based on a fault detection at node D, for example by using OTN fault detection or detecting loss of signal for example. A benefit is that there are now two paths through the OTN from node B, whereas there was only one available from node A in FIG. 18. Also this pre-empts the possibility of the unidirectional fault between nodes A and D becoming a bidirectional fault.

For path monitoring, a single-bit backward defect indication (BDI) signal is defined by ITU-T G.709 to convey the signal fail status detected in a path termination sink function in the upstream direction. BDI is set to "1" to indicate an ODUk backward defect indication, otherwise it is set to "0". See FIG. 9. The use of the OTN fault detection at node D for selecting egress AC or for selecting which input path to use, is optional in the sense that without it, some types of faults in the OTN network can still be detected indirectly. For example node D can infer a fault if it can't detect the active status indication, or the ingress nodes can detect a fault in the other direction and infer that it applies in both directions. If desired, in principle this could be signaled to node D or could cause a change in the operational status indication sent to node D and thus affect the selection at the egress. Thus the benefit of being able to protect against some faults in the OTN network, as well as protecting against AC faults, can still apply, even if only some types of fault are detected, and regardless of where they are detected.

FIGS. 19 to 21, Fifth Scenario, a Fault on Working OTN Paths in Two Directions,

In this scenario a LO-ODUk bidirectional failure occurs on a path that is carrying traffic. FIG. 20 shows method steps for operation using the network of FIG. 10 in this scenario with faults in both directions on a working OTN path. FIG. 19 shows the network with the faults but before the faults have been detected, and FIG. 21 shows the network after the fault and after the protection switching. At step 300, before any fault, traffic is sent from CE1-AC1-node A-node D-AC4-CE2. At step 510, at node D, a fault on OTN traffic unit from node A, is detected, and nodes C and D decide to select egress attachment circuit 3 as active instead of attachment circuit 4. At step 520, from node C, the indication of active status is sent back to nodes A and B, and from node D the indication of protection status is sent back to nodes A and B. At node A, at step 530, the second fault is detected at node A in the OTN traffic from node D. Node A and node B as egress nodes decide to change their attachment circuits. At step 540 at node A, the new standby status of AC1 is sent to nodes C and D and the active status of AC2 is sent from node B to nodes C and D. Node C detects the standby status from node A, and detects the active status from node B at step 550 and starts passing on traffic because the corresponding attachment circuit 3 has active status. Node D stops passing on traffic as AC4 has standby status.

In other words, egress (Sink) Node D detects a failure on LO-ODUk received from node A. Nodes C and D use the MC protocol and decide to alter AC4 to "Standby" and AC3 to "Active" state. The changed AC4 "Standby" status is signalled into the EXP field of LO-ODUk OH by Node D while the AC3 "Active" state is signalled by Node C. Also, Node A operating as an egress node detects a failure on LO-ODUk received from node D. Nodes A and B use the MC protocol and cause AC1 to become "Standby" and AC2 to become "Active" status. The changed AC1 "Standby" status is signalled into the EXP field of LO-ODUk OH by Node A while the AC2 "Active" state is signalled by Node B. Traffic flows from AC2 to Node B to Node C to AC3 as shown in FIG. 21

FIGS. 22 to 24, Sixth Scenario, Fault on Working OTN Paths in Two Directions Followed by a Fault in an Attachment Circuit, In this scenario a LO-ODUk bidirectional failure occurs on a path that is carrying traffic, followed by a fault in AC2. FIG. 23 shows method steps for operation using the network of FIG. 10 in this scenario. FIG. 22 shows the network with the faults but before they have been detected and FIG. 24 shows the network after the fault and after the protection switching. At step 300, before any fault, traffic is sent from CE1-AC1-node A-node D-AC4-CE2. At step 510, at node D, a fault on OTN traffic unit from node A, is detected, and nodes C and D decide to select egress attachment circuit 3 as active instead of attachment circuit 4. At step 520, from node C, the indication of active status is sent back to nodes A and B, and from node D the indication of protection status is sent back to nodes A and B. At node A, at step 630, the second fault is detected at node A in the OTN traffic from node D. When Node A also detects a third fault in AC2, Node A and node B as egress nodes decide that their attachment circuits status must have AC1 as active. At step 640, at node A, the active status is sent to nodes C and D. From node B the Down status is sent to nodes C and D. At node C, the status is detected and as a result the path from node A is selected. In other words after a bidirectional failure on LO-ODUk between node A and node D, traffic flows from AC2 to Node B to Node C to AC3 until the failure occurs on Active AC2. Then using the MC protocol, nodes A and B drive AC1 status to "Active" status and AC2 into "Down" status. The changed AC1 "Active" state is signalled into the EXP field of LO-ODUk OH by Node A while the AC2 "Down" status is signalled by Node B. Traffic flows from AC1 to Node A to Node C to AC3 as shown in FIG. 23.

FIGS. 25 to 27, Seventh Scenario, Fault in an Attachment Circuit Followed by Faults on Working OTN Paths in Two Directions In this scenario a LO-ODUk bidirectional failure occurs on a path that is carrying traffic, after a fault in AC2. FIG. 26 shows method steps for operation using the network of FIG. 10 in this scenario. FIG. 25 shows the network with the faults but before they have been detected and FIG. 27 shows the network after the fault and after the protection switching. At step 300, before any fault, traffic is sent from CE1-AC1-node A-node D-AC4-CE2. At step 710, at node B, the fault at AC2 is detected, and nodes A and B decide to set AC2 operational status as down, and node D continues to select traffic from node A. At step 720, nodes A and D then detect the second fault on the OTN path between nodes A and D. But node A cannot change the operational status of AC1, but node D does agree with node C to change operational status of AC3 and AC4. Node D sends the indication of standby status back to nodes A and B at step 730 and node C sends the indication of active status back to nodes A and B. At step 740, node A now selects traffic from node C and node C selects traffic from node A.

In other words, after the first fault and AC2 is in "Down" state, traffic flows from AC1 to Node A to Node D to AC4. After the bidirectional failure on the ODUk. between node A and node D, carrying traffic, Node A cannot trigger the LAG status change as AC2 is known to have the "Down" status. Node D however can trigger the LAG status change as AC3 is known to have the Standby state. Using the MC protocol, nodes C and D cause AC3 to have the "Active" status and AC4 to have the "Standby" status. The changed AC3 "Active" status is signalled into the EXP field of LO-ODUk OH by Node C while the AC4 "Standby" status is signalled by Node D. As shown FIG. 27, traffic now flows from AC1 to Node A to Node C to AC3.

FIG. 28, an Eighth Scenario, Involving a Fault on an OTN Node.

If a node carrying traffic fails, it is possible that more than one routing path is signaled as "Active". For instance, as in FIG. 28, when Node A fails; by means of the MC protocol, Node B declares and signals AC2 as "Active" and in this case it is possible that both paths arriving at Node D are locally and remotely "Active". In this case Node D can select the path considering also SCN/N ODU switching criteria, i.e other overhead can be taken into consideration. For example SF/SD defects that very probably Node D should receive from Node A (for instance ODU 001 defect) can be used to decide that Node D should select the path from node B. Then traffic would flow from AC2 to node B to node D to AC4.

CONCLUDING REMARKS

As described above, for protecting traffic on paths extending from a source client entity (CE1) to a destination client entity (CE2) via an optical transport network and attachment circuits at ingress and egress nodes, there are multiple paths within the OTN network, and the attachment circuits are dual homed. By sending (120) an indication of operational status of the dual homed attachment circuits within overhead associated with the traffic and sent with the traffic through the network, a selection can be made (130) at end nodes of the path, of which of the provided paths and attachment circuits to use for the traffic, based on the indicated operational status, to protect against a fault in the attachment circuit or in the OTN network. Thus protection can extend across the edge nodes without the complexity and delays involved in interworking of separate protection schemes and without a control plane.

Embodiments of the invention can enable more efficient protection of Dual Homed CE transported over an OTN transport network providing recovery mechanism for AC failure, node failure as well as ODUk failures. Advantages of the Dual Homed client protection can be combined with advantages of an ODUk protection arrangement where the 'classic criteria of the SNC are enhanced with client side status information. At least some embodiments of the protection mechanism proposed can provide resiliency to single failure (in the OTN network or in the attachment circuits) or to double failures.

REFERENCES

ITU-T G.709: Interfaces for the Optical Transport Network (OTN)

ITU-T G.873.1: Optical Transport Network (OTN): Linear protection

IEEE 802.3 AX: Link Aggregation—Distributed Resilient Network Interconnect under study for next revision of the standard (http://www.ieee802.org/1/files/public/docs2011/bq-nfinn-AXbq-editing-0311-v01.ppt)

IETF draft document: draft-ietf-pwe3-iccp

The invention claimed is:

1. A method of protecting traffic in a communications network, the communications network providing paths for the traffic extending from a source client entity to a destination client entity via an optical transport network, providing at least one attachment circuit for coupling the source client entity to corresponding ingress nodes of the optical transport network, and providing at least one attachment circuit at the egress, for coupling corresponding egress nodes of the optical transport network to the destination client entity, the attachment circuits comprising dual homed attachment circuits at least at the ingress nodes, and the paths comprising paths within the optical transport network, to couple respective pairs of the ingress and egress nodes, the method having steps of:
    sending through the optical transport network an indication of operational status of at least one of the dual homed attachment circuits, the indication being sent within overhead associated with the traffic and sent with the traffic, and
    at a node of the optical transport network, selecting which of the provided paths and attachment circuits to use for the traffic, based on the indication of operational status of the attachment circuits sent through the optical transport network, to protect the traffic against a fault in the attachment circuit and against a fault in the optical transport network.

2. The method of claim 1, the operational status comprising at least one of an indication of a protection status, and an indication of a fault status.

3. The method of claim 1 when, where the dual homing is at the ingress nodes, and where there are paths from the ingress nodes to the egress node, and the sending step comprises sending the indication forwards along the paths, to the egress node, and the step of selecting comprises selecting at the egress node which of the paths to use for the traffic according to the indications received.

4. The method of claim 1, where the dual homing is at both the ingress nodes and the egress nodes, and there are paths from each of the ingress nodes to more than one of the egress nodes, the selecting step comprising selecting which egress node to use for the traffic, according to the operational status of the attachment circuits.

5. The method of claim 4, where there is dual homing at the egress nodes, the sending step comprising feeding back the indication along the paths, to other nodes along the paths.

6. The method of claim 5, the communications network providing paths for traffic in both directions between the source and destination client entities, and having the step of sending in both directions the indications of operational status in overhead associated with the traffic and sent with the traffic.

7. A computer program on a non-transitory computer readable medium having instructions which when executed by a processor cause the processor to control the steps of the method of claim 1.

8. A method of protecting traffic in a communications network, the communications network providing paths for the traffic extending from a source client entity to a destination client entity via an optical transport network, providing at least one attachment circuit for coupling the source client entity to corresponding ingress nodes of the optical transport network, and providing at least one attachment circuit at the egress, for coupling corresponding egress nodes of the optical transport network to the destination client entity, the attachment circuits being dual homed attachment circuits at least at the ingress nodes, and the paths comprising paths within the optical transport network, to couple respective pairs of the ingress and egress nodes, the method having steps of:
    at an ingress node inserting an indication of operational status of at least one of the dual homed attachment circuits into overhead associated with the traffic, and
    sending the overhead with the indication within, with the traffic, to other nodes along the paths.

9. A method of protecting traffic in a communications network, the communications network providing paths for the traffic extending from a source client entity to a destination client entity via an optical transport network, providing at least one attachment circuit for coupling the source client entity to corresponding ingress nodes of the optical transport network, and providing at least one attachment circuit at the egress, for coupling corresponding egress nodes of the optical transport network to the destination client entity, the attachment circuits being dual homed attachment circuits at least at the ingress nodes, and the paths comprising paths within the optical transport network, to couple respective pairs of the ingress and egress nodes, the method having steps of:
    reading at a node of the optical transport network an indication of operational status of a corresponding one of the dual homed attachment circuits, the indication being within overhead associated with the traffic and sent with the traffic, and
    selecting which of the provided paths and attachment circuits to use for the traffic, based on the indication of the operational status of the attachment circuits sent through the optical transport network, to protect the traffic against a fault in the attachment circuit and against a fault in the optical transport network.

10. The method of claim 9, having the step of receiving an indication of a fault in the paths in the optical transport network and the selecting step being based also on the fault indication.

11. A node configured to operate at least as an ingress node of an optical transport network for use in a communications network, the communications network being arranged to provide paths for traffic extending from a source client entity to a destination client entity via the optical transport network, to provide at least one attachment circuit for coupling the source client entity to corresponding ingress nodes of the optical transport network, and to provide at least one attachment circuit at the egress, for coupling corresponding egress nodes of the optical transport network to the destination client entity, the attachment circuits comprising dual homed attachment circuits at least at the ingress nodes, and the paths comprising paths within the optical transport network, to couple respective pairs of the ingress and egress nodes, the node having:
- a mapper for receiving client traffic from the dual homed attachment circuit and mapping client traffic into containers for sending over the optical transport network,
- an overhead circuit for inserting an indication of an operational status of at least one of the dual homed attachment circuits into overhead associated with the traffic, and
- an output circuit for outputting the overhead with the indication within, with the traffic to other nodes along the paths.

12. The node of claim 11, the indication having an indication of a protection status, and an indication of a fault status.

13. A node configured to operate at least as an egress node of an optical transport network for use in a communications network, the communications network being arranged to provide paths for traffic for the traffic extending from a source client entity to a destination client entity via an optical transport network, to provide at least one attachment circuit for coupling the source client entity to corresponding ingress nodes of the optical transport network, and to provide at least one attachment circuit at the egress, for coupling corresponding egress nodes of the optical transport network to the destination client entity, the attachment circuits comprising dual homed attachment circuits at least at the ingress nodes, and the paths comprising paths within the optical transport network, to couple respective pairs of the ingress and egress nodes, the node having:
- an input circuit for reading indications of an operational status at least one of the dual homed attachment circuits, the indication being within overhead associated with the traffic, and sent with the traffic and
- a controller for selecting which of the provided working paths, protection paths and attachment circuits to use for the traffic, based on the indication of operational status of the attachment circuits sent through the optical transport network, to protect the traffic against a fault in the attachment circuits or in the optical transport network.

14. The node of claim 13, configured to receive an indication of a fault in the paths in the optical transport network and the controller being configured to select based also on the fault indication.

15. The node of claim 13, the dual homing being at the ingress and egress, and paths being provided from each of the ingress nodes to more than one of the egress nodes, the controller being configured to cooperate with other egress nodes to select which of the egress nodes to use for the traffic, according to the operational status of the attachment circuits.

16. The node of claim 13, operable also as an ingress node, and having a mapper for receiving client traffic from a corresponding dual homed attachment circuit and mapping client traffic into containers for sending over the optical transport network,
- an overhead circuit or inserting an indication of an operational status of at least one of the dual homed attachment circuits into overhead associated with the traffic, and
- an output circuit for outputting the overhead with the indication within, with the traffic to other nodes along the paths.

* * * * *